March 11, 1952     O. S. FIELD ET AL     2,588,916

NAVIGATIONAL SYSTEM FOR AIRWAYS TRAFFIC CONTROL

Filed Feb. 2, 1948     9 Sheets-Sheet 1

INVENTORS
O.S. Field and J.E. Freehafer
BY
Neil W. Preston
Their ATTORNEY

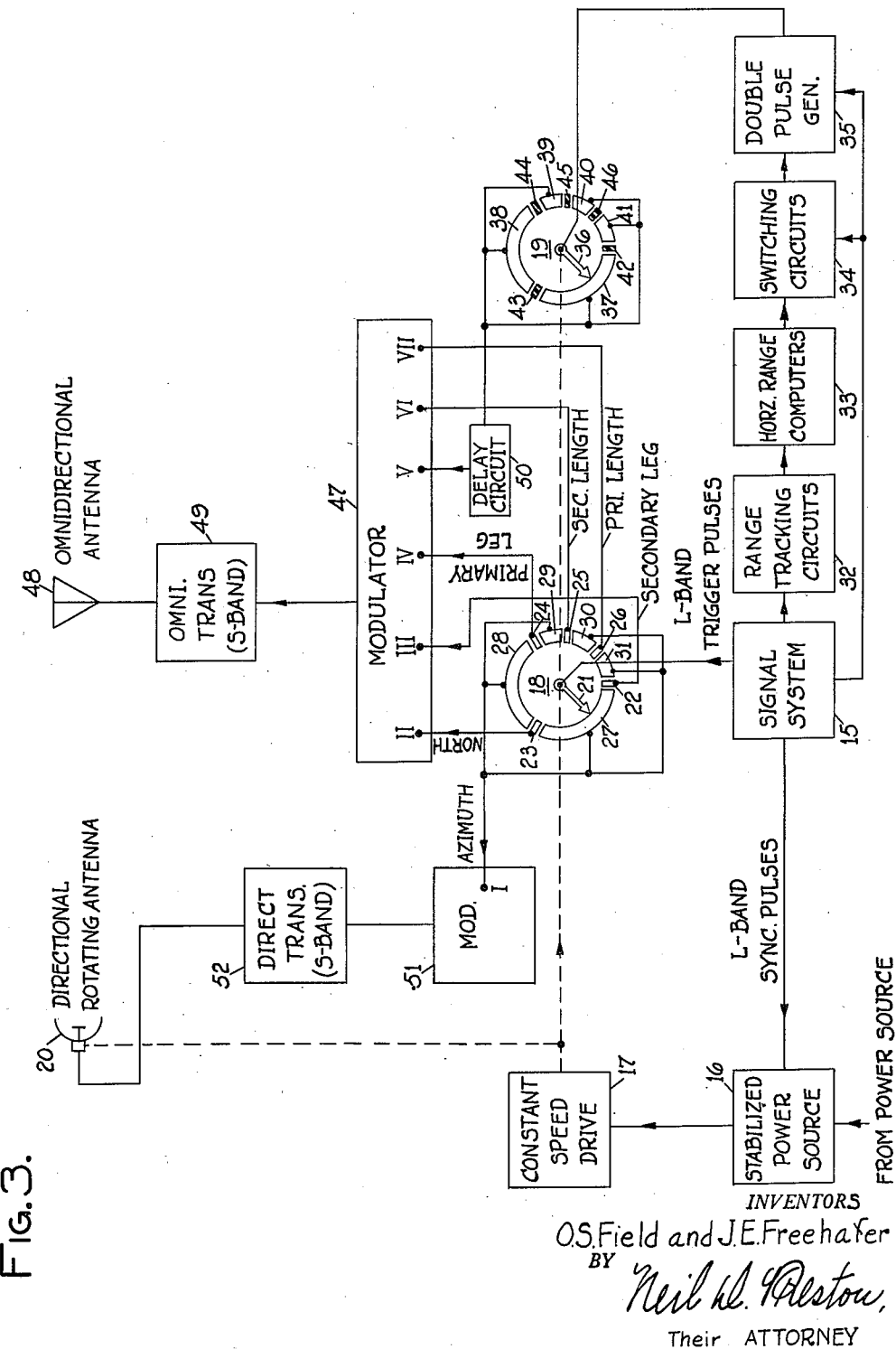

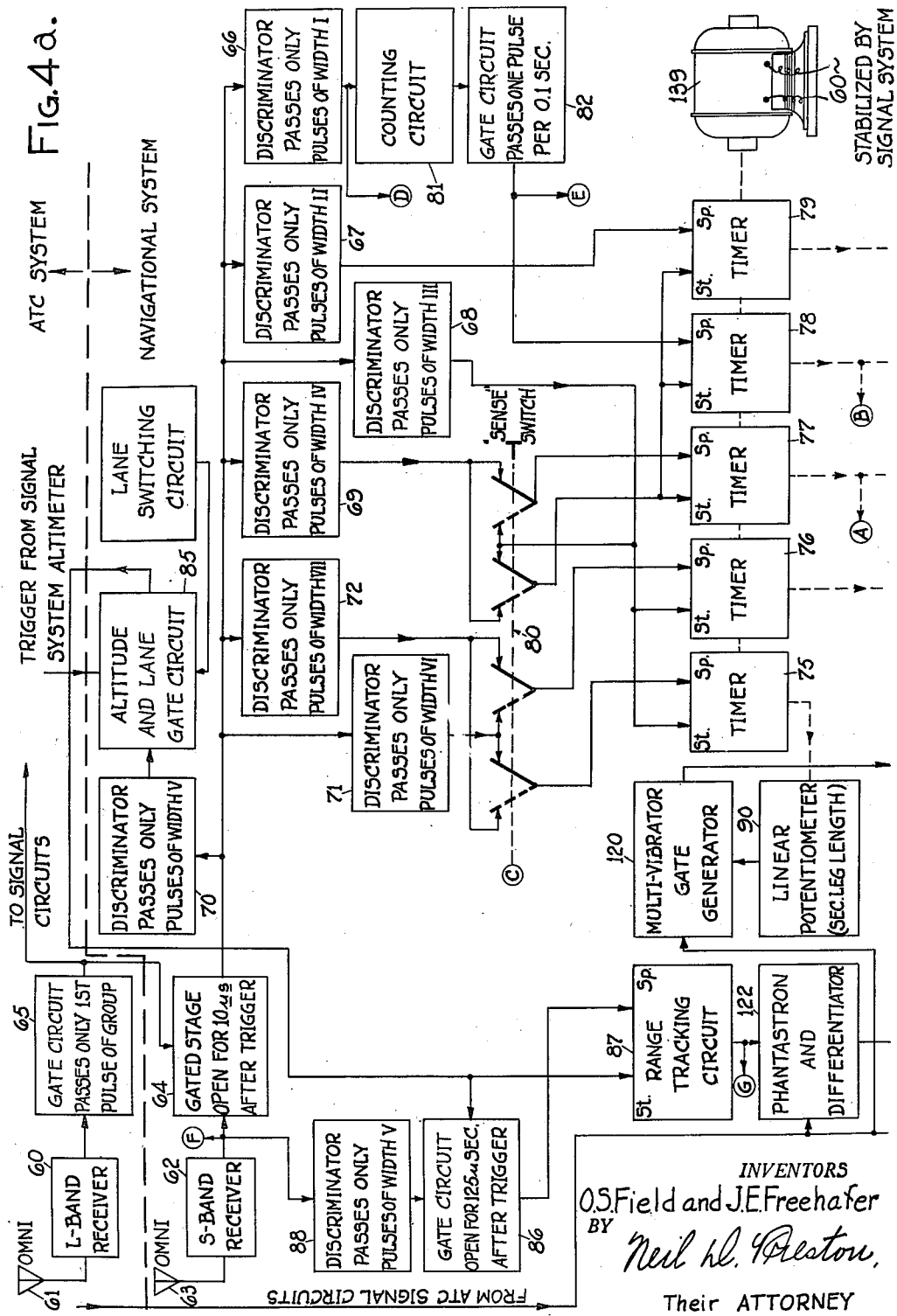

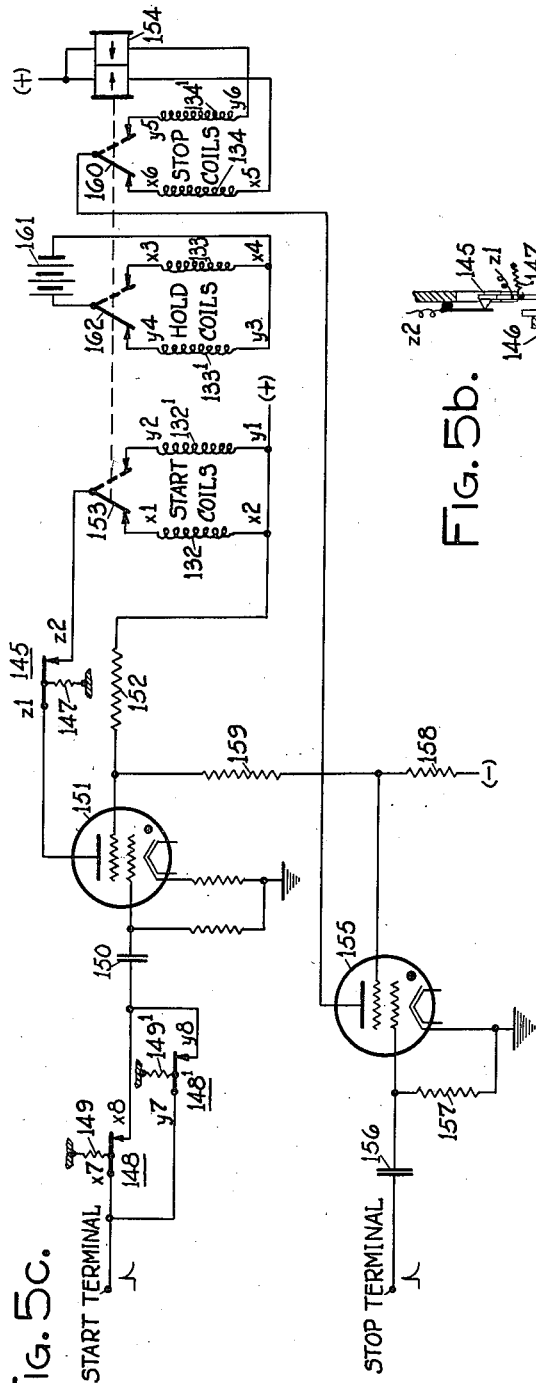

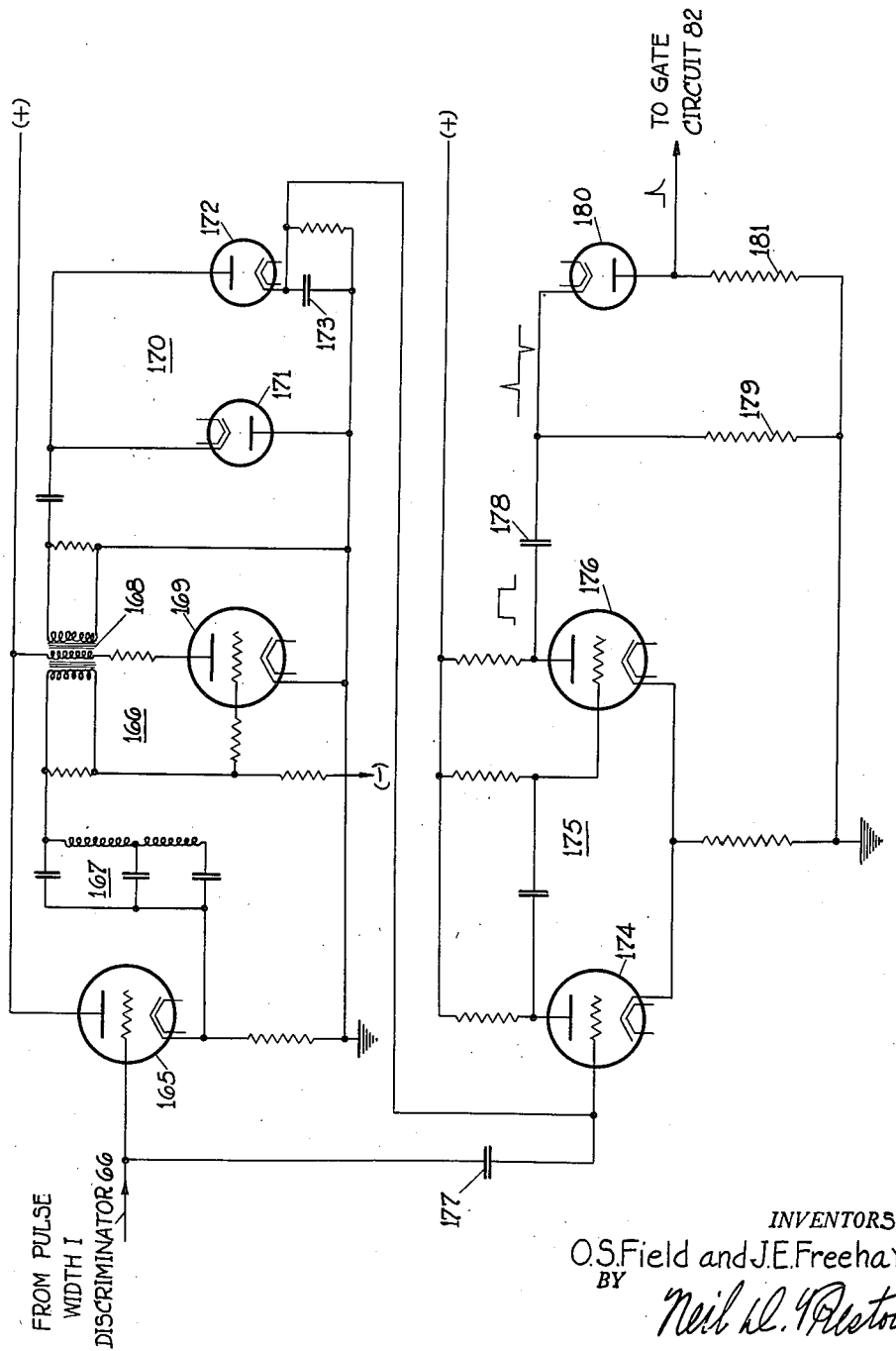

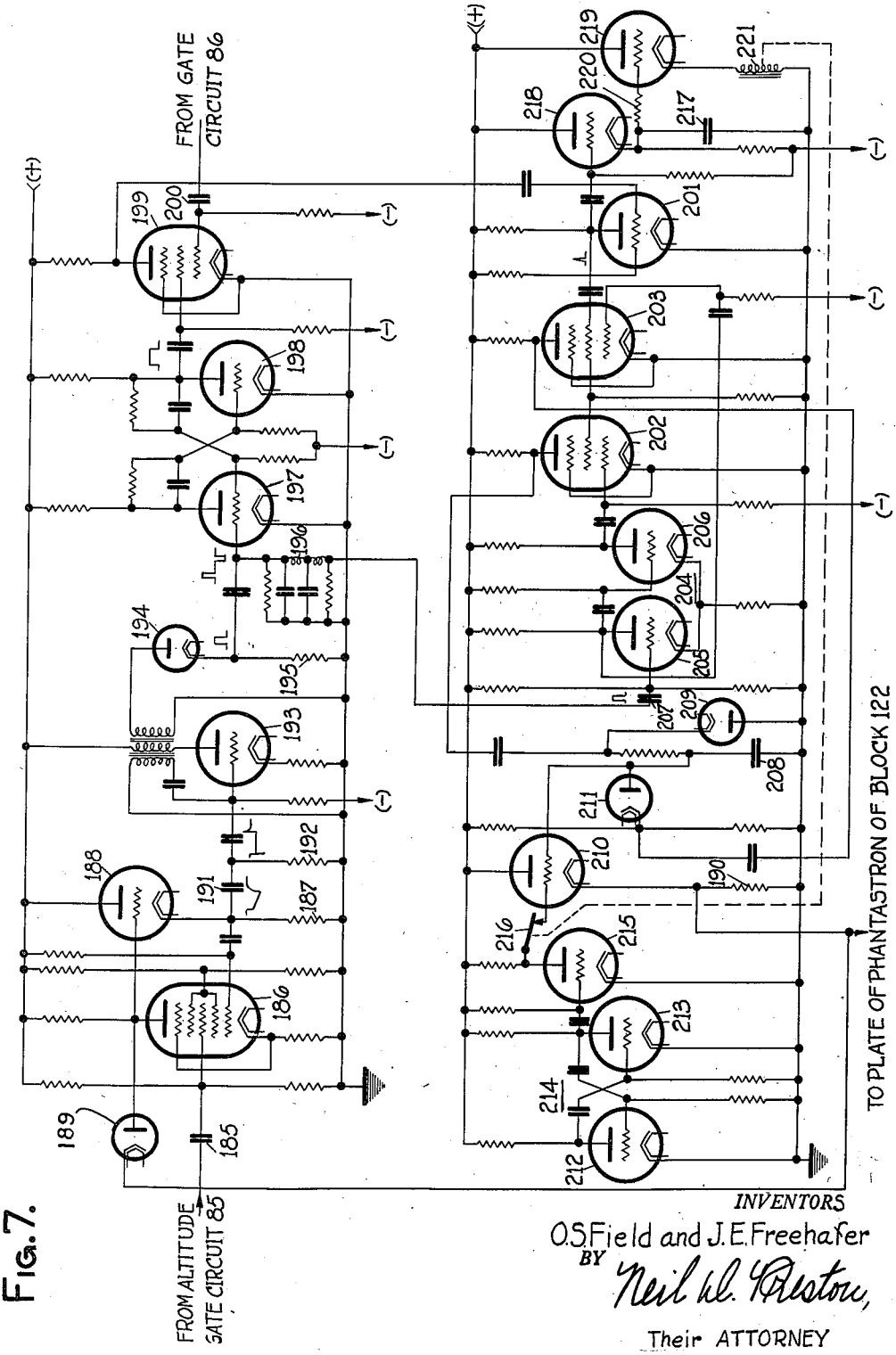

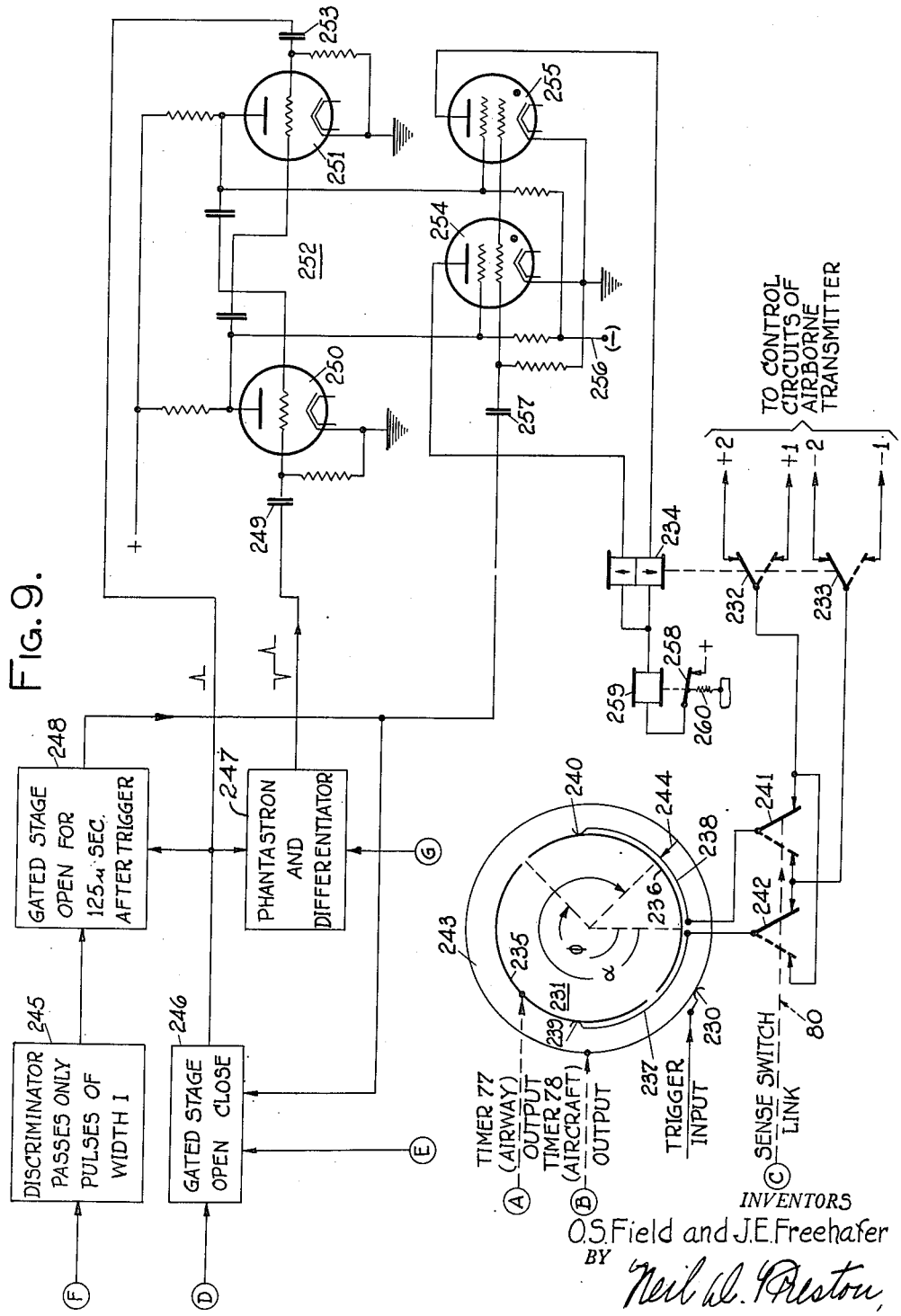

Patented Mar. 11, 1952

2,588,916

UNITED STATES PATENT OFFICE 2,588,916

NAVIGATIONAL SYSTEM FOR AIRWAYS TRAFFIC CONTROL

Oscar S. Field and John E. Freehafer, Rochester, N. Y., assignors to General Railway Signal Company, Rochester, N. Y.

Application February 2, 1948, Serial No. 5,766

20 Claims. (Cl. 343—6)

This invention relates to navigational systems and more particularly to such systems adapted for use with an airway traffic control system such as, for instance, is disclosed in the co-pending application of H. C. Kendall and L. H. Orpin, Serial No. 743,046, filed May 22, 1947, and assigned to the same assignee.

In this prior application is disclosed an airway traffic control system utilizing a series of timed synch pulses, each separated by a plurality of timed altitude or information pulses. These pulses are transmitted simultaneously by a plurality of ground stations arranged serially to form an air lane, and aircraft flying along this air lane contain receiving apparatus for receiving these pulses and transmitting apparatus for transmitting reply pulses to certain of them. Each aircraft apparatus includes gating circuits such that only pulses from the nearest ground station are effective to cause the aircraft to transmit reply pulses. Each ground station also includes gating circuits so timed that only reply pulses arriving from aircraft within a predetermined area surrounding the ground station are received by the ground station receiving apparatus. In order to allow each ground station to transmit to and receive information from a plurality of aircraft within its block boundary so defined, successive altitude or information pulses following each synch pulse are characterized for different altitude zones, and an altitude-sensitive device on each aircraft controls its gating circuits such that only the altitude or information pulses intended for its particular altitude zone are effective at the aircraft. Provision is made at both the ground station and the aircraft for changing the characteristics of the pulses transmitted from each and communication links are also provided between ground stations so that an integrated system of communication is available which may, as described in the above application, be utilized to transmit to aircraft information as to adjacent traffic conditions. Visual indications in this prior application are disclosed in the form of indicating lamp signals in the aircraft cockpit, green for a clear lane ahead, red for occupancy by another aircraft ahead, etc., these lamps being controlled by the aircraft receiving apparatus above-mentioned.

Accordingly, the principal object of this invention is to provide a navigational system for use with an airway traffic control system which will provide a visual picture or map of the air lane and the position of aircraft relative to the air lane.

Another object of this invention is to provide such a navigational system utilizing pulse transmission which may be synchronized with the pulse transmission of a cooperating airway traffic control system.

Still another object of this invention is to provide an indicator for such a system which will accurately show the length and/or azimuth of the legs of an air lane relative to a ground station, and the range and azimuth of aircraft from the same station as well as their heading relative to the airway.

Another object of this invention is to provide such a system which operates upon a fixed frequency so that no adjustment need be made to airborne apparatus from the time an aircraft leaves an airport until it arrives at its destination.

A further object of this invention is to determine at a ground station slant range to an aircraft, compute the horizontal range therefrom, and thereafter transmit this information to the aircraft.

A further object of this invention is to transmit information to an aircraft for conversion into a navigational system indication on a cathode ray tube my means of pulses of varying durations or paired pulses timed after an initial or sync pulse.

A further object of this invention is to provide such a system wherein the transmission is produced simultaneously with the transmission of pulses by a cooperating airway traffic control system transmitter but on a different frequency.

A still further object of this invention is to provide a means for accurately determining the center of a beam of radio energy arriving at an aircraft without the use of loop antennas such as, for instance, are utilized in goniometers or direction finders.

Other and further objects will appear during the course of the following description when taken with the accompanying drawings, in which:

Fig. 2b is an expanded view of a portion of the wave form diagram of Fig. 2a;

Fig. 3 is a block diagram of the ground station components of the system;

Figs. 4a–4b are a block diagram of the airborne components of the system;

Figs. 5a–5c show one form of an electromechanical timer which may be utilized in the airborne equipment shown diagrammatically in Figs. 4a–4b;

Fig. 6 shows one form of pulse counting circuit which may be utilized in the airborne equipment shown diagrammatically in Figs. 4a–4b;

Fig. 7 shows one form of range tracking circuit which may be utilized in the airborne equipment shown diagrammatically in Figs. 4a–4b;

Fig. 8 shows the indicator of Fig. 1 modified to produce more than two horizontal parallel lanes; and, Fig. 9 shows one form of a lane switching circuit which may be used with the airborne equipment shown diagrammatically in Figs. 4a–4b to indicate to a ground station position of the aircraft in the proper lane of more than two horizontal parallel lanes.

Figure 1:
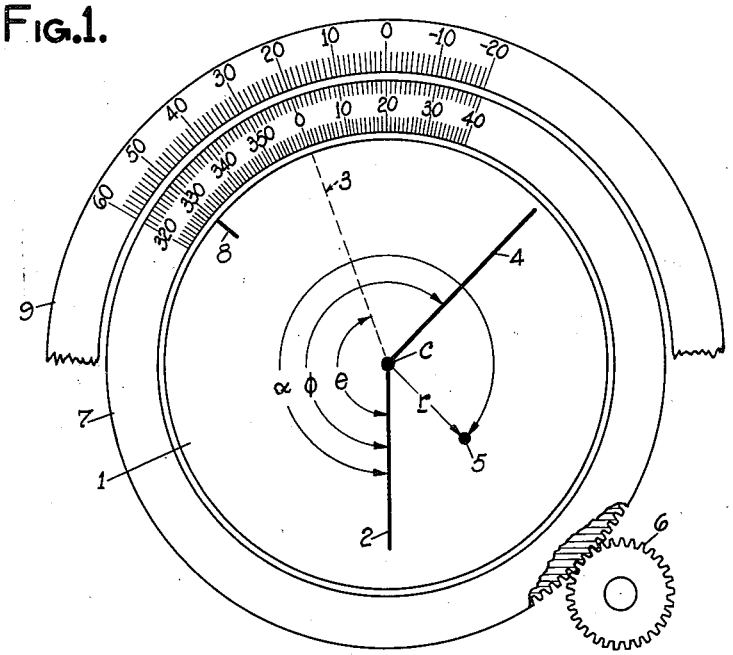
Fig. 1 shows a display according to the invention as seen on the cathode ray tube indicator.

The system of the above application shows a means for dividing into a plurality of vertical altitude zones a section of an air route defined by ground stations arranged serially. Through the use of the navigational system described herein, each vertical altitude zone may be further divided horizontally into a plurality of lanes which preferably are parallel.

Briefly, this navigational system comprises the transmission of pulses from a rotating antenna and an omni-directional antenna at each ground station, the transmission of the pulses being synchronized with the transmission of pulses by the ATC (airway traffic control) system but on a different frequency. The explanation which follows will be given, in general, in terms of pulse width for the sake of simplicity, but it is to be understood that in each case the use of paired pulses is also contemplated where the leading edge of the initial pulse of the pair is timed in the same fashion as the leading edge of the pulse of varying width exemplified, and the second pulse of the pair is timed after the first in the same fashion that the width of the explained pulse is varied and for the same purpose. Also, by secondary leg of an air lane is meant the leg which the aircraft traverses going toward a ground station within a block, and by the primary leg is meant the leg which the aircraft will traverse going away from the ground station toward the next ground station of the defined air lane. For purposes of explanation, it will be assumed that the ATC system is transmitting in the L-band of frequencies, and that the pulses transmitted by the navigational system are S-band pulses.

Initially, an omni-directional S-band pulse of distinctive width is transmitted from the navigational transmitter simultaneously with one of the L-band pulses (either sync or altitude) from the ATC transmitter. This pulse, when received at the aircraft, will be utilized to start the timing circuits of its navigational system and to produce a secondary leg marker on a cathode ray tube indicator. Two subsequent omni-directional S-band pulses, each of a distinctive width different from that denoting the secondary leg, are thereafter transmitted at times which are predetermined at each ground station to designate north relative to the azimuth of the secondary leg of the air lane and the azimuth of the primary leg relative to the secondary, respectively. The aircraft's apparatus includes a timer for each distinctive width other than that denoting the secondary leg, each timer being started by the first omni-directional pulse above-described (the secondary leg pulse) and stopped by the subsequent omni-directional pulse of the distinctive width to which it is responsive. Each timer produces an output in the form of an angular displacement whose magnitude is proportional to the time between the two received pulses to which it is responsive. The angular displacement output of each timer is connected to a corresponding sine-co-sine resolver whose output in turn is connected to the deflecting elements of a cathode ray tube. Thus when sweep voltages determined by the resolver in known manner are applied to the cathode ray tube, radial traces will be produced on the cathode ray tube screen at angular positions corresponding to the angular displacement of each timer.

In addition, an S-band pulse of still a different distinctive width is transmitted by a rotating directional antenna at each ground station simultaneously with each of the L-band pulses (either sync or altitude) from the ATC transmitter whenever an omni-directional S-band pulse is not being transmitted. Only certain of these directional pulses will be received at the aircraft, namely, those which are transmitted by the ground station during the time the directional antenna thereof is pointing at the aircraft. Equipment is provided in the aircraft for measuring the time between the reception at the aircraft of each omni-directional S-band pulse corresponding to the secondary leg and these subsequently received directional S-band pulses, and this is fed through still another timer and associated resolver to the cathode ray tube to produce on the cathode ray tube screen an indication of the azimuth of the aircraft relative to the secondary leg.

One additional bit of information is necessary at the aircraft, namely, the range of it from the ground station. This is provided by transmitting a pair of omni-directional S-band pulses of still another different distinctive width from the ground station, the first of these being transmitted substantially simultaneously with the L-band pulse from the ATC transmitter corresponding to the altitude zone in which the aircraft is located. The second pulse of the pair is spaced after the first by a distance equal to the ground range of the aircraft relative to the ground station, as computed by the ground station. This is possible because the slant range to each aircraft is available at each ground station due to the fact that the latter sends out L-band pulses and receives reply pulses thereto from each aircraft, the time elapsing between such transmission and reception being a measure of the slant range to the corresponding aircraft, as is too well known to require further explanation. Equipment is provided on the aircraft to measure the time elapsing between the two pulses of this pulse pair and apply an output proportional to this time to the cathode ray tube so as to produce an indication denoting the aircraft's range from the ground station at the angular position of the aircraft with respect to the secondary leg which has been determined and applied to the cathode ray tube in the manner above-described.

The form which these cathode ray tube indications may take is illustrated in Fig. 1, which shows a view of the face or screen of a cathode ray tube indicator 1. In this representation the nearest ground station, associated with the primary and secondary legs of the air lane shown, is to be understood as located at the center C of the cathode ray tube. The downwardly extending radial trace 2 indicates the secondary leg of the air lane. Displaced from this at an angle $\theta$ (reading clockwise) is a dotted radial line 3 representing north with respect to the secondary leg 2. This line is shown dotted because it may or may not be shown on the cathode ray tube screen as desired. The primary leg of the air lane is indicated by radial line 4, making an angle $\phi$ with secondary leg 2. The aircraft itself is represented by dot 5, which as shown is at an angle $\alpha$ (reading clockwise) with respect to the secondary leg 2 and at a range $r$ from the ground station at C. It is to be noted that the angles $\theta$ and $\phi$ are fixed values for each ground station once the air lane has been determined and laid out, whereas the angle $\alpha$ is variable and depends upon the position of each aircraft with respect to the ground station at C. Since the direction of North is always known at the aircraft by means of its fluxgate compass, this map on the face of the cathode ray tube indicator 1 can be oriented with respect to north in known manner by means of devices such as synchros, which may, for instance, be connected to the gear 6 of Fig. 1. Gear 6 engages with peripheral teeth on ring 7 on which are provided degree marks as shown, the synchro mechanism maintaining ring 7 so that the zero degree mark is always lined up with the north direction of the cathode ray tube indicator picture, which is indicated by dotted line 3 as noted above.

The length of radial lines 2 and 4, representing the secondary and primary legs of the air lane respectively, may be made the same and controlled at the airborne apparatus, preferably being made long enough to extend almost the periphery of the face of the cathode ray tube 1. However, in many cases it may be desirable to indicate at the aircraft the actual lengths of the secondary and primary legs of the particular block within which the aircraft is located. Usually, the secondary and primary legs will be of the same length, but a more general situation will be assumed for purposes of explanation and exemplification in which the lengths of the secondary and primary legs differ from one another. Thus, as illustrated in Fig. 1, radial trace 4, representing the primary leg, is longer than radial trace 2, representing the secondary leg. The length of each leg of the air lane is, of course, fixed at the time the air lane is laid out. Information can, therefore, be transmitted from each ground station as to the length of each of its legs by means of a pulse of another distinctive width transmitted at the proper time after the initial pulse, which will hereinafter be denoted as of width III, utilizing the period of time between transmission of successive pulses of width III to denote the maximum length of an air lane leg which will ever be encountered along an air lane. These subsequent pulses, denoting the lengths of the primary and secondary leg, or the single pulse denoting both their lengths if they are of the same length, will also be transmitted simultaneously with the nearest L-band ATC pulse, either sync or altitude. Thus the length of each leg will be determined within an accuracy equal to the maximum length of air lane leg divided by twice the number of L-band pulses transmitted by the ATC system. As will be pointed out hereinafter, the exemplified ATC system transmits 1080 pulses per second, and hence the accuracy of the exemplified system is equal to the maximum length of air lane leg divided by 2160.

The aircraft operator would also like to be able to determine at a glance the heading of his aircraft with respect to north. This may also be applied to the face of the cathode ray tube indicator 1 as line 8, the direction of this being obtained from the plane's fluxgate compass via another synchro mechanism. In Fig. 1, the aircraft at 5 has a heading of 330° as indicated by line 8, whereas if it were flying properly parallel to the secondary leg 2 it would have a heading of approximately 20°. To assist the aircraft operator to determine at a glance the amount of correction necessary to regain his correct course, an outer ring 9 may be provided as shown relative to the cathode ray tube 1 and having plus and minus degree marks as indicated. This outer ring 9 is made manually rotatable but may be held fixed at any desired angular position, and preferably is rotated as necessary so that the air lane leg being traversed (either secondary or primary) always points toward 0°. Since as shown, the aircraft at 5 is traversing the secondary leg of the air lane, ring 9 is now aligned so that radial trace 2 points toward 0°. Thus, by following a line from the center C through heading marker 8 and extending it out either visually or by means of an "overlay," the aircraft operator can immediately see that a correction of 50° must be applied in order to regain his proper course under no wind conditions.

The ATC system disclosed in the above application transmits L-band pulses at a frequency of 1080 cycles per second, or in other words, one pulse every 926 microseconds. These transmitted ATC L-band pulses are in the form of a series of distinctively characterized sync pulses, each separated by 17 altitude pulses, which in turn each characterize a different altitude zone from 1 to 17. For convenience, the transmission of a sync pulse followed by 17 altitude pulses is referred to as one sequence scan. Each sequence scan, or cycle, covers $\frac{1}{60}$ of a second, and 60 sync pulses are transmitted per second.

It is to be understood, of course, that an airway may be divided into altitude zones and each altitude zone may be further subdivided into lanes. It is clear that in this generalized system it is possible to assign in an orderly manner to each altitude and each lane a definite interrogation pulse in a sequence scan to which an aircraft within the airspace defined by that altitude zone and that lane responds for the purpose of registering occupancy in the proper air space at the ground station and to which the aircraft equipment listens in order to obtain instructions addressed to it from the ground. Thus in the exemplified system in which seventeen altitude pulses constitute a sequence scan, it is to be understood that sufficient channels are available to gather occupancy information and to provide signals for an airway comprising either one lane and seventeen altitudes or two lanes and four altitudes or four lanes and four altitudes or eight lanes and two altitudes or seventeen lanes and one altitude. The term altitude zone is used in a general sense to mean a block of air space defined by a lane and an altitude zone.

The present invention provides among other facilities a means for operating a lane switch whose function is to control the time at which the aircraft responds to the signals from the cooperating ATC system in accordance with the lane which it occupies in the same way and for the same purpose for which the altitude switch controls the time of operation in accordance with the altitude occupied by the aircraft.

Figure 2A:
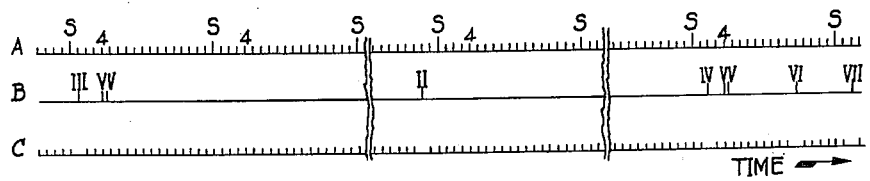
Fig. 2a shows portions of a wave form diagram illustrating the operation of the system.

In Fig. 2a, line A represents portions of a series of such sequence scans, sync pulses being indicated by the letter S and separated from one another by 17 altitude pulses of which only the fourth is marked, since it will be assumed for purposes of the following explanation that only one aircraft is within the block boundaries of the ground station and that aircraft is within the fourth altitude zone. Line B represents the omni-directional S-band pulses sent up by a navigational system according to this invention, and line C represents similarly the directional S-band pulses transmitted by such a navigational system.

Referring to line B, it will be seen that initially an omni-directional pulse of width III is sent up coincident with the transmission of one of the L-band ATC pulses. It makes no difference whether this coincident L-band pulse is a sync or altitude pulse, and in this example the initial S-band pulse of width III is shown coincident with a pulse corresponding to the first altitude zone. Since as above noted, the aircraft is assumed to be in altitude zone 4, an omni-directional S-band pulse of width V is next sent up substantially coincident with the first L-band pulse corresponding to altitude zone 4 occurring thereafter, and followed by a second pulse of width V before another L-band pulse is transmitted. The time interval between the two pulses of width V denotes the projected range on the ground, or horizontal range, from the ground station to the aircraft as above-mentioned, and the manner in which this is determined will be pointed out more fully hereinafter.

Since the second pulse of a pair of range pulses can not be transmitted simultaneously with an L-band pulse, provision must be made to avoid interferences which arise from this circumstance. Accordingly, the stations along the airway are arranged to transmit range information in sequence. Thus, for example, stations may be counted off along the airway in cycles of four. Stations number one transmit range information during the first sequence scan only; stations number two transmit range information during the second sequence scan only, etc. Thus, stations which transmit simultaneously are separated by four blocks and presumably are not within interference distance of each other. The fact that the first pulse of a range pair is transmitted simultaneously with an L-band pulse makes it possible for the airborne equipment to recognize the sequence scan during which the closest station is transmitting range information and causes it to accept the second pulse of the pair. Thus, in the exemplified system of 17 interrogation pulses per sequence scan, range information reaches an aircraft fifteen times a second.

As noted above, each cycle represented in line A is 1/60 of a second, and an omni-directional pulse of width III is transmitted every 60 cycles, or one per second. Therefore, using the time interval between pulses of width III to mark 360°, if a pulse were to be transmitted simultaneously with each L-band pulse occurring between the transmission of each pulse of width III, each such pulse would mark one third of a degree of angular rotation (360°÷1080). At the proper time after the pulse of width III to determine the angle $\theta$ (Fig. 1) between the secondary leg and north, an omni-directional S-band pulse of width II is transmitted, again simultaneously with the nearest L-band pulse. The angle $\theta$ is thus transmitted accurately within one-sixth of a degree.

The next omni-directional pulse transmitted is a pulse of width V, the first of another pair denoting the ground or horizontal range to the aircraft, and substantially simultaneously with the next L-band pulse corresponding to altitude zone 4. This is followed by another pulse of width V, the time interval between the two pulses of width V denoting the horizontal range between the ground station and the aircraft as above-described. Thereafter, at a time determined by the angle $\phi$ (Fig. 1) an omni-directional S-band pulse of width IV is transmitted, again simultaneously with the nearest one of the L-band ATC pulses (either sync or altitude, as the case may be), and thus fixing the angle $\phi$ accurately also within one-sixth of a degree.

Omni-directional S-band pulses of width VI and VII are transmitted at times determined by the lengths of the secondary and primary legs respectively as above-described, and again simultaneously with the nearest one of the L-band ATC pulses as also illustrated in line B.

Line C represents the S-band pulses of width I which are transmitted from the rotating directional antenna of the ground station simultaneously with each L-band pulse whenever a pulse of width II, III, IV, VI, or VII is not being transmitted. This rotating directional antenna is driven at exactly 60 R. P. M. (1 R. P. S.) and its movement is synchronized so that it is pointing exactly in the direction of the secondary leg when pulses of width III are being transmitted from the omni-directional antenna of the ground station. Thus, pulses of width I will be received at an aircraft only when the ground station directional antenna is "looking" at the aircraft, and the time interval between the reception at the aircraft of the previous pulse of width III and such pulses of width I will be a measure of the bearing of the aircraft relative to the secondary leg of the ground station. Therefore, the angle $a$ (Fig 1) is also relayed to the aircraft.

Figure 2B:
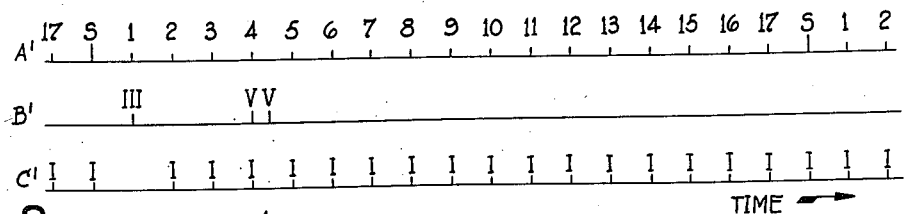

Fig. 2b is an expanded view of a portion of the wave form diagram of Fig. 2a, including one sequence scan of the ATC transmitted L-band pulses, and shows more clearly the relation between the ATC pulses of line A' and the omni-directional and directional pulses transmitted by a system according to this invention and represented by lines B' and C' respectively.

Figure 2C:
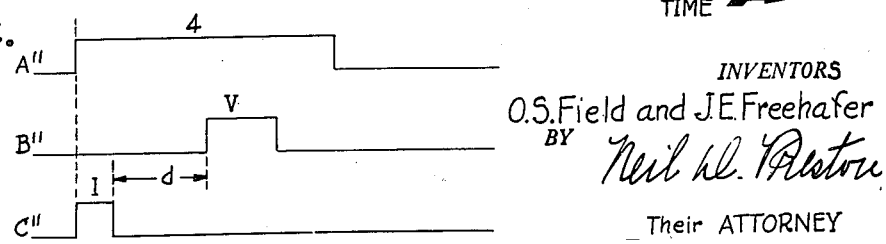
Fig. 2c is a further expanded view of a portion of the wave form diagram of Fig. 2b.

As will be apparent from Fig. 2b, it is required, according to the system, that a pulse of width I be sent up substantially simultaneously with the first pulse of each pulse pair of width V. If the first pulse of each pulse pair of width V were transmitted exactly simultaneously with a pulse of width I, it is possible that the two might, at certain bearings relative to the ground station, be received simultaneously by aircraft at those bearings. This would occur only infrequently, since pulses of width I are transmitted directionally by a rotating antenna at the ground station, whereas pulses of width V are transmitted omni-directionally. However, when it did occur, the two pulses would be superimposed on the aircraft receiver, and the resultant wave form would depend upon the relationship between the radio frequency phases of the two signals. One solution to the problem is to arrange that each ground station transmit range information, by means of pulse pairs of width V, only on alternate one-second intervals, and disable the directional transmitter so that pulses of width I are not transmitted whenever a pulse of width V is being transmitted. With this arrangement, every other second is available for azimuth information alone. An objection to this method of operation is that it slows down the system by a factor of two, since navigation information is then corrected on the aircraft only every two seconds instead of every second. A better and preferred solution is to use short pulses for widths I and V and to arrange that pulses I and V are transmitted in sequence with a short interval $d$ between them, as illustrated in Fig. 2c. For example, pulse width I could be one microsecond in length and pulse width V two microseconds. The pulse of width I, as shown in line C'', is transmitted simultaneously with the beginning of the corresponding ATC L-band pulse intended for the fourth altitude zone (line A''). The first pulse of a pair of pulses of width V (line B'') would then be transmitted $d$ microseconds after the pulse of width I. Thus, assuming $d$ to be three microseconds, the pulse of width I and the first pulse of width V, together with the interval between them, require only six microseconds and, insofar as coincidence with the corresponding L-band ATC pulse is concerned, would be treated by the aircraft receiver like a single six-microsecond pulse from the ground station. When the aircraft is not being swept by the rotating directional beam, the number I pulse is missing, but the first number V pulse follows the position of the potential number I pulse by three microseconds as before. While in Fig. 2c the ATC pulse in line A'' has been indicated as being of greater duration than the combined widths of pulses I and V plus the intervening interval $d$, it is to be noted that the duration of this ATC pulse varies in accordance with the information as to adjacent traffic conditions transmitted by the ground station to aircraft in the particular altitude zone, which in the exemplified case is altitude zone 4. This does not raise any problem, however, since as will be pointed out hereinafter in connection with the block diagram of a system according to this invention, any S-band pulse received within ten microseconds after the leading edge of an L-band ATC pulse is treated as being received simultaneously with that L-band ATC pulse.

Fig. 3 is a block diagram of a ground station equipment according to the invention. Block 15 represents the ground station signal system of the cooperating ATC system and from this are fed L-band sync pulses once every $1/60$ of a second to stabilize power source 16 in order to insure stabilization of the pulse transmission and of the rotation of the directional antenna. Stabilized power source 16 is fed from a separate main power source and its output is fed to a constant speed drive 17 whose mechanical output at exactly 60 R. P. M. (1 R. P. S.) is coupled to commutators 18 and 19 and directional rotating antenna 20. L-band trigger pulses, both sync and altitude, are also fed from signal system 15 to the rotating slider 21 of commutator 18. Commutator 18 has ten segments 22 to 31 as shown. When rotating slider 21 is connected to commutator segment 22, pulses of width III will be transmitted, denoting the secondary leg. As noted above, directional rotating antenna 20 is adjusted to make exactly one revolution per second and is synchronized so as to point in the direction of the secondary leg at the instant when slider 21 is connected to segment 22 and a pulse of width III is transmitted. When slider 21 continues in its rotation and connects with segments 23 and 24 in turn, pulses of widths II and IV respectively will be transmitted, denoting north and the primary leg respectively. When slider 21 rotates further and connects with segments 25 and 26 in turn, pulses of widths VI and VII will be transmitted, denoting the length of the secondary and primary legs respectively. Again, it is to be noted that the position of the secondary and primary legs and their respective lengths are determined for a particular ground station when the air lane is laid out with respect thereto, and hence the relative positions of commutator segments 22—26 are fixed at that time. The width of each of segments 22—26 is made just sufficient to insure the transmission of a single pulse of widths III, II, IV, VI, and VII respectively and each coincident with an L-band pulse, and thus each segment covers slightly less than one-third of a degree. The remaining segments 27—31 of commutator 18 are connected together so that pulses of width I may be transmitted whenever pulses of widths II, III, IV, VI, and VII are not being transmitted.

To signal system 15 are coupled range tracking circuits 32 which determine the slant range to each aircraft from which L-band reply pulses are received. The output of range tracking circuits 32 is connected to horizontal range computers 33, which in known manner transfer each slant range indication into a horizontal range indication. The output of horizontal range computers 33 is connected to switching circuits 34, which are also controlled by triggers from signal system 15 so that each horizontal range is associated with the proper altitude zone and lane of the corresponding aircraft. The output of switching circuits 34 is connected to a double pulse generator 35, which is controlled by triggers from signal system 15 in a manner similar to that explained for switching circuits 34 and for the same reason. Double pulse generator 35 produces a first trigger pulse coincident with the proper signal pulse from signal system 15 and a second pulse delayed thereafter by a time fixed by the output of horizontal range computers 33. The output of double pulse generator 35 is connected to the rotating slider 36 of the second commutator 19. Commutator 19 is similar to commutator 18 and has segments 37—41 corresponding to segments 27—31 of commutator 18. Insulating segments 42—46 corresponding to segments 22—26 of commutator 18 are provided between segments 37—41, which are connected together and thence to modulator 47 to produce pulses of pulse width V from omni-directional antenna 48 via omni-directional transmitter 49. A delay circuit 50 is preferably inserted in the line leading from segments 37—41 to modulator 47 in order to delay the transmission of each pulse of width V the proper amount of time after the initiating trigger derived from commutator 19 in order to insure that a pulse of width V will never be received simultaneously with a pulse of width I at an aircraft, as explained above in connection with Fig. 2c. Segments 22—26 of commutator 18 are connected to other inputs of modulator 47 to produce omni-directional pulses of widths III, II, IV, VI and VII respectively as above-described. Segments 27—31 of commutator 18 are connected to modulator 51, which in turn controls directional transmitter 52 to produce pulses of width I from rotating directional antenna 20.

Figure 4B:
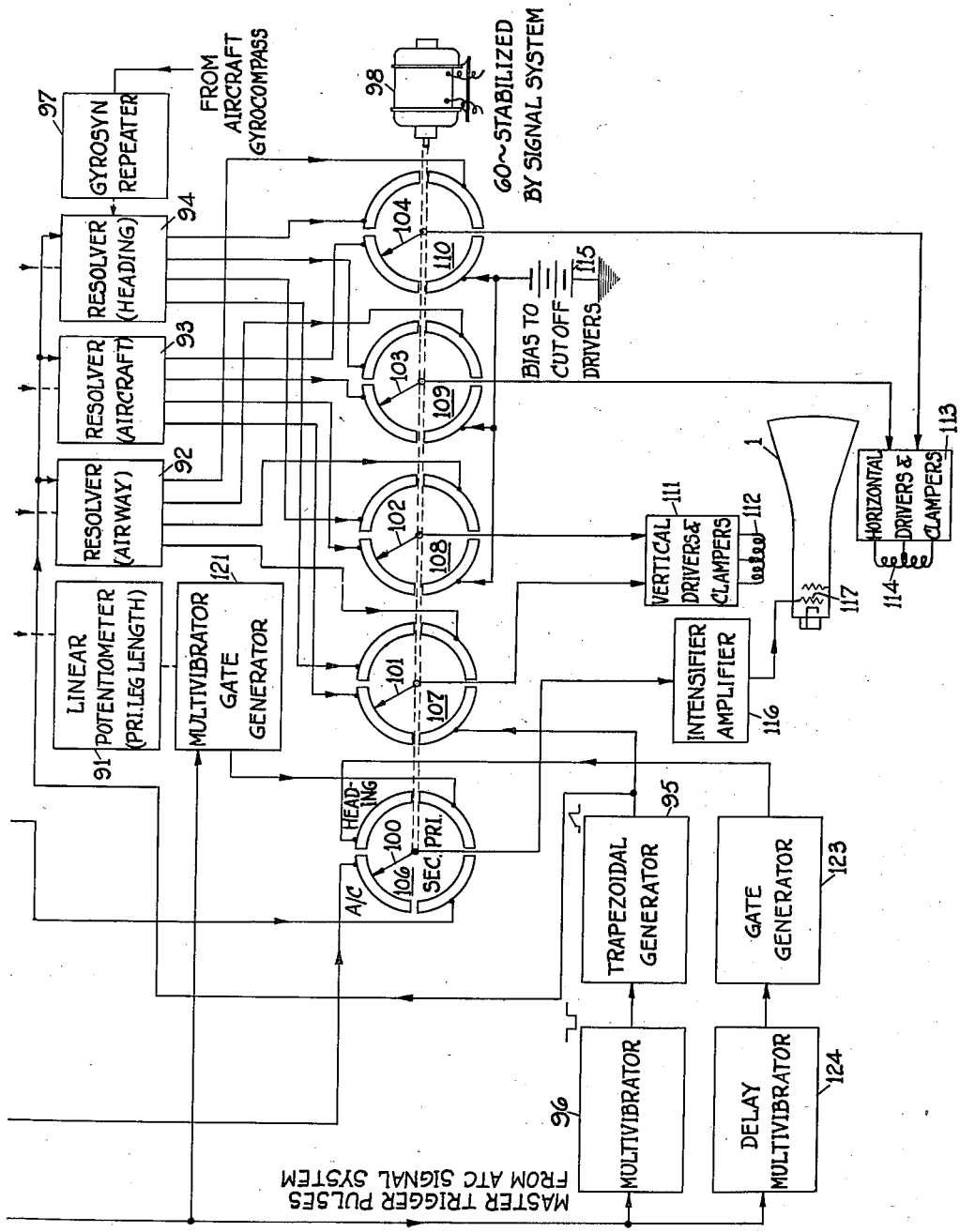

Figs. 4a and 4b illustrate a block diagram of an airborne equipment for receiving the pulses transmitted according to the invention by the ground station equipment just described with reference to Fig. 3. The aircraft is assumed to be equipped also with an ATC system as described in the above application and hence includes an airborne L-band receiver 60 having an omni-directional antenna 61. The airborne equipment according to the invention includes an S-band receiver 62 having an omni-directional antenna 63. Each S-band pulse will be received by omni-directional antenna 63 and thereafter conveyed through S-band receiver 62. In order to insure that S-band pulses of widths I–VII will be effective only if received from the nearest ground station, a gated stage 64 is provided after S-band receiver 62 and this is in turn controlled by a gate circuit 65 included in the ATC system and controlled by ATC L-band receiver 60. As explained in the above application, gate circuit 65 passes only the first L-band pulse of any group received by the omni-directional antenna 61, thereafter failing to pass any pulse received by omni-directional antenna 61 for approximately 926 microseconds. Since the first L-band pulse of a group received will necessarily be from the nearest ground station, thus only L-band pulses from the nearest ground station can pass gate circuit 65 to trigger gated stage 64, which thereafter will pass any signal from S-band receiver 62 for a period of 10 microseconds after the trigger.

Figure 5A:
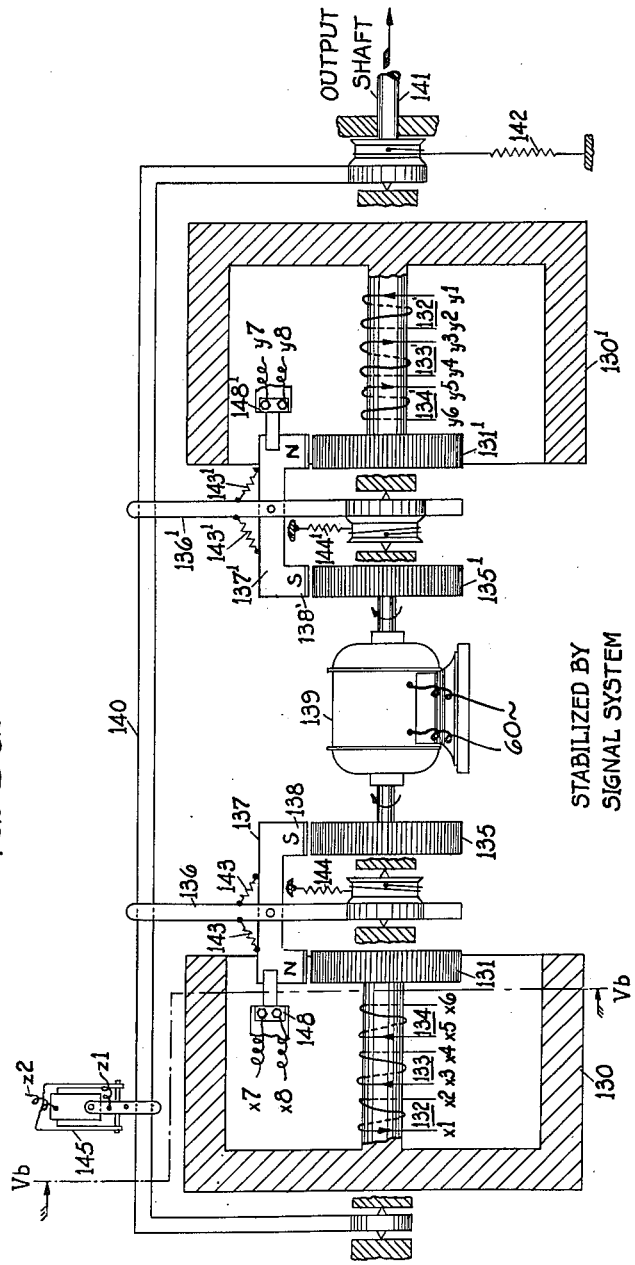

The output of gated stage 64 is connected to discriminators 66—72 in parallel. Discriminators 66—72 are each adjusted to pass only a pulse of a particular width of widths I-VII respectively. The output of discriminator 68, which passes only pulses of width III, is connected to timers 75—79 respectively, the connection to timers 77—79 being made through a "sense" switch 80 whose purpose will be explained more fully hereinafter. Each pulse of width III passed by discriminator 68 starts timers 75—79 operating. Thereafter, when an S-band pulse of width II from the nearest ground station is received at omni-directional antenna 63, it will be passed by receiver 62, gated stage 64 (since it is received simultaneously with a corresponding L-band pulse, either sync or altitude) and thence by discriminator 67, whose output is connected to timer 79 to stop its operation. One form which timers 75—79 may take is illustrated in Figs. 5a-5c and will be explained more fully hereinafter. As pointed out above, and hence only briefly repeated here, each timer produces a mechanical angular output varying between zero and 360° and proportional to the time between the pulse starting the timer and the pulse stopping its operation.

When the subsequent omni-directional pulse of width IV from the nearest ground station is received by antenna 63, it is passed by receiver 62, gated stage 64 and discriminator 69, which is connected via "sense" switch 80 to timer 77 to stop its operation and thus produce an angular output therefrom equal to the angle φ between the secondary leg and primary leg of the nearest ground station. Similarly, the omni-directional S-band pulses of widths VI and VII are received and passed by their respective discriminators 71 and 72 via "sense" switch 80 to stop the operation of their corresponding timers 75 and 76 and thus fix the lengths of the indications of the secondary and primary legs respectively. Pulses of width I transmitted directionally from the nearest ground station are received by omni-directional antenna 63 whenever the ground station rotating directional antenna 20 (Fig. 3) is pointed at the aircraft, and these pulses are then passed by receiver 62, gated stage 64 and discriminator 66. These pulses of width I passed by discriminator 66 are next fed to a circuit 81 which counts them and produces an output simultaneously with the median one. One form which this counter may take is shown in Fig. 6 and will be described more fully hereinafter. The purpose of this counter is, of course, to increase the accuracy of the azimuth indication of the aircraft relative to the ground station given to the aircraft by the ground station. It is necessary because even directional antennas have finite beam widths and hence the aircraft will receive several pulses of width I as the ground station directional antenna 20 (Fig. 3) rotates past it.

The output of counting circuit 81 is fed through a gate circuit 82 which passes only one pulse per 0.1 second. This gate circuit 82 insures that only one pulse output from counting circuit 81 will be effective each time the ground station directional antenna 20 (Fig. 3) rotates past the aircraft. The output of gate circuit 82 is fed to timer 78 to stop its operation, which has previously been started as above-described by the initial reception of a pulse of width III. The resulting mechanical angular output of timer 78 is equal to the bearing of the aircraft relative to the secondary leg of the ground station from which the pulses of width I are being received, or in other words, angle α (Fig. 1).

The first pulse of each pair of pulses of width V received at S-band receiver 62 via omni-directional antenna 63 is similarly passed by gated stage 64 and discriminator 70. The output of discriminator 70 is fed to altitude and lane gate circuit 85, to which is also fed a corresponding trigger from the ATC system altimeter switch to insure that the pulse of width V is intended for the particular altitude zone lane in which the aircraft is located. The output of altitude and lane gate circuit 85 is then fed to gate circuit 86 and range tracking circuit 87 in parallel. A second discriminator 88, which passes only pulses of width V, is connected between the output of S-band receiver 62 and gate circuit 86. Gate circuit 86 is triggered on from the output of discriminator 70 for an interval equal to 125 microseconds thereafter, which is the maximum allowable time interval between the individual pulses of each pulse pair of width V. The output of gate circuit 86 is connected to range tracking circuit 87 also. Thus, the first pulse of a pulse pair of width V received at the aircraft is passed by gated stage 64, discriminator 70, and altitude and lane gate circuit 85 to open gate circuit 86 and also to start the operation of range tracking circuit 87. This first pulse is also passed by discriminator 88, but does not pass gate circuit 86 because the latter has not been triggered on yet. The second pulse of the pulse pair of width V is not passed by gated stage 64 because it is not received within ten microseconds after the corresponding L-band ATC pulse, but is passed by discriminator 88 and gate circuit 86 to stop the operation of range tracking circuit 87, whose output is a voltage proportional to the time interval between the pulses of the pulse pair and thus proportional to the horizontal range of the aircraft from the ground station as determined at the ground station.

The mechanical angular outputs of timers 75 and 76 are connected to linear potentiometers 90 and 91 respectively, whose outputs are thus voltages proportional respectively to the length of the secondary and primary legs of the nearest ground station. The mechanical angular outputs of timers 77—79 are connected to resolvers 92—94 respectively. Each resolver is fed with a trapezoidal voltage input derived from trapezoidal generator 95. Generator 95 in turn derives its input from multivibrator 96, which is triggered on by master trigger pulses (both sync and altitude) from the airborne ATC signal system. Resolver 94 is fed with a second mechanical angular input equal to the heading of the aircraft relative to north from a gyrosyn repeater 97, which in turn is controlled by the fluxgate compass of the aircraft. The voltage outputs of resolver 92 will thus be a measure of the bearing of the primary leg of the air lane relative to the secondary leg, the voltage outputs of resolver 93 will be a measure of the bearing of the aircraft relative to the secondary leg of the air lane, and the voltage outputs of resolver 94 will be a measure of the heading of the aircraft relative to the secondary leg.

The mechanical input for each of timers 75—79 is derived from motor 139, whose power is supplied from a 60-cycle source and is stabilized by the ATC sync trigger pulses in a manner similar to that above-described in connection with the constant speed drive 17 of Fig. 3. Motor 139 rotates at exactly 60 R. P. M. (1 R. P. S.). Another motor 98 is mechanically connected to the sliders 100—104 of five commutators 106—110 respectively, each of which has four segments electrically insulated from one another and each covering substantially 90 degrees. This motor 98 operates at 1800 R. P. M. The four output leads from each of resolvers 92—94 are connected to corresponding segments of commutators 107—110. Sliders 101 and 102 of commutators 107 and 108 respectively are connected to the inputs of vertical drivers and clampers 111, whose output is connected to vertical deflecting elements 112 of cathode ray tube indicator 1. Similarly, sliders 103 and 104 of commutators 109 and 110 respectively are connected to the inputs of horizontal drivers and clampers 113, whose output is connected to horizontal deflecting elements 114 of cathode ray tube indicator 1. The fourth segment of commutators 108—110 is connected to ground through a biasing source 115 of sufficient magnitude to cut off horizontal drivers and clampers 113 and that vertical driver of block 111 which produces the upward vertical sweep. The corresponding fourth segment of commutator 107 is connected to the output of trapezoidal generator 95 and provides energy for that vertical driver of block 111 which produces the downward vertical sweep. Slider arm 100 of commutator 106 is connected to the input of intensifier amplifier 116, whose output is connected to beam intensifier element 117 of cathode ray tube indicator 1. The output of linear potentiometer 90 is connected to a multivibrator gate generator 120, to which is also fed master trigger signals from the ATC signal system, and its output is connected to one segment of commutator 106. The output of linear potentiometer 91 is connected to multivibrator gate generator 121, which similarly is fed with triggers from the ATC signal system to initiate its operation, and its output is connected to a second segment of commutator 106. The voltage output of range tracking circuit 87 is connected to phantastron and differentiator 122, which similarly has its operation initiated by master trigger pulses from the ATC signal system, and its output is connected to a third segment of commutator 106. The fourth segment of commutator 106 is fed from gate generator 123, which in turn is controlled by delay multivibrator 124, whose input is connected to the source of master trigger pulses from the ATC signal system.

The purpose of commutators 107—110 is to feed successively to cathode ray tube indicator 1 sweep voltages at angular positions corresponding to the relative positions of the secondary leg, the aircraft relative to the secondary leg, the heading of the aircraft relative to the secondary leg, and the primary leg relative to the secondary leg. The purpose of commutator 106 is to properly intensify the beam of the cathode ray tube indicator 1 at these angular positions. As indicated, each commutator has only four segments, and thus a trace on the cathode ray tube indicator 1 is produced for one one-hundred-twentieth of a second each one-thirtieth second, the four desired indicia being displayed in turn, and persistence of luminescence of the indicator screen as well as persistence of vision of the observer being relied upon to insure a continuous visual presentation. Note that since the sweep circuits are triggered on by the master pulses from the ATC signal system, which occur at the rate of 1080 per second, each trace is repeated approximately $$\frac{1080}{120}$$

or 9 times during each one one-hundred-twentieth second that each slider arm of a commutator is connected to a single segment. It is, of course, obvious that the number of segments can be increased as desired to include additional indicia, such as, for instance, the position of neighboring aircraft within the same block. Also the number of segments can be doubled, tripled, etc., if necessary to prevent "flicker" of the presentation on the cathode ray tube indicator face.

As pointed out above, reception of each pulse of width III by omni-directional antenna 63 simultaneous with an L-band ATC pulse by omni-directional antenna 61 of the ATC system starts the operation of each of timers 75—79. Each of these timers has its operation stopped by the receipt via omni-directional antenna 63 of the proper subsequent S-band pulse simultaneous with the reception of a corresponding L-band ATC pulse via omni-directional antenna 61 of the ATC system. Thus, receipt of a subsequent pulse of width VI stops the operation of timer 75 such that its mechanical angular output is a measure, as a fraction of 360 degrees, of the length of the secondary leg of the air lane. In the same fashion, pulses of widths VII, IV, I and II stop the operations of timers 76—79 respectively to produce respective mechanical angular outputs denoting the length of the primary leg, the angular position of the primary leg relative to the secondary leg, the angular position of the aircraft relative to the secondary leg, and north relative to the secondary leg respectively, each as a function of 360 degrees. By applying the mechanical angular outputs of timers 75 and 76 to linear potentiometers 90 and 91 and supplying each of these potentiometers with a suitable voltage, the resultant voltage outputs from their sliders, relative to the total voltage applied is a measure of the lengths of the secondary and primary legs of the air lane respectively. These voltages from the sliders are then applied to multivibrator gate generators 120 and 121 respectively, whose operation is initiated every 1/1080 of a second by master trigger pulses, both sync and altitude, from the ATC signal system. Each multivibrator gate generator 120 and 121 thus produces a gate output starting simultaneously with each L-band ATC pulse received by the airborne equipment, the ending of the voltage gate output of these generators 120 and 121 being determined by the voltage output from linear potentiometers 90 and 91 respectively. These voltage gates are then applied by means of commutator 106 for the proper length of time to fix the length of the corresponding radial traces on the cathode ray tube indicator 1 proportional to the lengths of the secondary and primary legs respectively of the air lane at the nearest ground station. The angular position of these radial air lane leg traces is determined by means of resolver 92 and biasing source 115. Since the deflecting elements of cathode ray tube indicator 1 exemplified are in the form of electromagnetic coils, it is, of course, necessary to provide trapezoidal sweep voltages, which are derived from trapezoidal generator 95. Note that the segments of commutators 106—110 are so oriented that the segment of each corresponding to each of the four indicia to be displayed on the face of the cathode ray tube indicator 1 is traversed at the same time and for the same period of time. Thus, whenever slider 100 of commutator 106 is connected to its segment corresponding to the secondary leg, fed from multivibrator gate generator 120, slider 101 of commutator 107 is also connected to its corresponding segment, fed by trapezoidal generator 95, and sliders 102—104 of commutators 108—110 are each connected to their corresponding segment, which is fed by biasing source 115. Thus, during the one one-hundred-twentieth second of each one-thirtieth second during which sliders 100—104 are connected to these segments of commutators 106—110, a vertical radial trace extending downwardly from the center on the face of the cathode ray tube indicator 1 is produced, its length being fixed by the mechanical angular output of timer 75 as above-described.

Resolvers 92 and 93 resolve the output from trapezoidal generator 95 into the proper sine and co-sine components as determined by the mechanical angular output of their respective timers 77 and 78, which sine and co-sine components are then fed to vertical drivers and clampers 111 and horizontal drivers and clampers 113 at and for the times fixed by commutators 107—110 to produce the proper angular positions of the traces corresponding respectively to the positions of the primary leg and the aircraft relative to the secondary leg, which, as has been seen above, is arbitrarily fixed on the face of the cathode ray tube indicator 1 so as to be always in a vertical downwardly extending position. The beam of the cathode ray tube at the angular position corresponding to that of the aircraft is intensified only at a radial distance proportional to the horizontal range of the aircraft from the ground station at C (Fig. 1), this being obtained by means of the differentiated output of the phantastron included in block 122.

Similarly, the beam produced at the angular position corresponding to the heading of the aircraft is intensified only for a relatively short length adjacent the periphery of the face of the cathode ray tube indicator 1, the length of this trace being determined via slider 100 of commutator 106 by the duration of the voltage gate output of gate generator 123 and its start being fixed by the output of delay multivibrator 124. The angular position of the heading of the aircraft is derived from resolver 94 by means of the fourth segment of each of commutators 107—110. Note that if the mechanical output of gyrosyn repeater 97 were not also fed into resolver 94, the electrical output from the latter would produce a radial trace on cathode ray tube indicator 1 denoting north relative to the secondary leg. Since the heading of the aircraft is of more use to the pilot, the additional mechanical output from gyrosyn repeater 97 is provided which in known manner varies the resolver voltage output to give the heading of the aircraft instead of north relative to the secondary leg.

"Sense" switch 80 is included because the secondary leg of the air lane is arbitrarily defined as the leg of a particular block which an aircraft traverses in flying toward the block station of that block and, as noted above, the secondary leg has been arbitrarily fixed so as always to be in a vertical downwardly extending position on the face of cathode ray tube indicator 1. In the position of "sense" switch 80 shown, it has been assumed that the aircraft exemplified is flying in a generally northerly rather than southerly position, and that the air lane runs generally north and south. On its return flight, the aircraft pilot would operate "sense" switch 80 so that the connections from discriminators 71 and 72, and 68 and 69 would be reversed, which will result in the proper orientation of the four indicia (primary and secondary legs, aircraft position, and aircraft heading) on the face of cathode ray tube indicator 1 for a south-bound aircraft. While the use of "sense" switch 80 has been explained for northerly or southerly flights along a generally north-south air lane, it will be obvious that the same holds true for easterly or westerly flights along a generally east-west air lane.

In Figs. 5a–5c is illustrated diagrammatically one form of an electromechanical timer which may be utilized in the equipment of Figs. 4a–4b. Each timer has two similar halves as shown in Fig. 5a, which operate alternately to produce a mechanical angular output, the magnitude of this output being determined by the spacing between two subsequent pulses applied to the control circuit thereof, which is illustrated in Fig. 5c. Each half includes a fixed magnetic yoke 130 which is fabricated in the form of a cylindrical can or cup having a central internal shaft. Each half thus has a generally E-shaped cross section as shown in Fig. 5a. To the free end of each central shaft is affixed a gear 131, and three windings 132—134 are provided on the yoke as shown. Adjacent each gear 131 and coaxial therewith is provided a second gear 135, of the same diameter and having the same number of teeth and driven from motor 139 (Fig. 4b) at exactly 1 R. P. S. Between each gear 131 and 135 is pivotally secured a lever 136, the pivot axis being coaxial with the center of gears 131 and 135. A transverse arm 137 is pivotally secured to lever 136 adjacent the periphery of gears 131 and 135 as shown. The end of arm 137 adjacent gear 135 is provided with an ear 138 adapted to be engaged between any two adjacent teeth of gear 135 when arm 137 is rotated slightly clockwise. The arm 137 is a permanent magnet with a north pole N adjacent to gear 131. The end of magnet 137 adjacent gear 131 is similarly fashioned so as to be engaged between any two adjacent teeth of gear 131 when arm 137 is rotated slightly counter-clockwise. A yoke 140 is pivotally secured coaxially with gears 131 and 135 and the pivot points of levers 136, and is provided at one end with an output shaft 141 as well as a zero positioning spring 142. Levers 136 and 136¹ are of sufficient length to engage yoke 140 when either lever pivots about its pivot axis. Springs 143 may also be provided between lever 136 and arm 137 to maintain these parts normally at right angles to one another so that in the absence of a voltage applied to coils 132—134, ear 138 does not engage gear 135 and magnet 137 does not engage gear 131. Also, a zero positioning spring 144 may be provided for each lever 136.

Looking at Fig. 5a from the left, as in Fig. 5b, motor 139 is assumed to be rotating in a counterclockwise direction. Directing attention first to the left-hand half of Fig. 5a, coil 132 is so wound that when it is energized the periphery of gear 131 will assume a north magnetic polarity so that the adjacent end of magnet 137, which is also of north polarity as shown, will be repelled. Arm 137 will, therefore, be rotated clockwise until ear 138 is engaged between two of the teeth of gear 135. Lever 136 will therefore move in a counter-clockwise direction (Fig. 5b) simultaneous with the movement of gear 135 at 1 R. P. S. and will carry yoke 140 along with it until ear 138 is disengaged from gear 135. The disengagement of ear 138 from gear 135 is accomplished by means of coil 134, which reverses the polarity of the periphery of gear 131 so that the end of magnet 137 adjacent gear 131 is attracted to the latter and held between two of its gear teeth. This is accomplished by energizing coil 134 to a sufficient degree to overcome the magnetism produced by coil 132, which is then deenergized. Yoke 140 is thus held at an angular position determined by the time interval elapsing between the energization of coils 132 and 134. As will be discussed hereinafter in detail in connection with Fig. 5c, the right-hand half of Fig. 5a is next operated in the same fashion as that just described for the left-hand half. Lever 136¹ is moved from its zero position, from which it always starts due to the tension of spring 144¹, when start coil 132¹ is energized and ear 138¹ engages gear 135¹. The resultant angular position at which lever 136 stops is determined by the time thereafter at which stop coil 134¹ is energized, start coil 132¹ again being deenergized at the same instant. If the angular position assumed by lever 136' is greater than that initially assumed by lever 136, yoke 140 will be carried on to the new position assumed by lever 136'. On the other hand, if the angular position assumed by lever 136' is less than that previously assumed by lever 136, yoke 140 will thereafter be drawn back into engagement at the angular position of lever 136' due to the urging of spring 142, because at the same instant that stop coil 134' is energized all three coils (132—134) of the left-hand half of Fig. 5a will be de-energized so that arm 137 will return to its normal position perpendicular to lever 136, and lever 136 will thus return to its zero position due to the urging of spring 144. The cycle above described is then repeated indefinitely as long as coils 132, 134, 132' and 134' are energized in succession, levers 136 and 136' determining the angular position of yoke 140 alternately, and hence the angular position of output shaft 141. Coils 132'—134' of the right-hand half of Fig. 5a are, of course, also deenergized at the same instant that stop coil 134 of the left-hand half is energized, thus permitting the alternate operation of yoke 140 by levers 136 and 136' as described. Coils 133 and 133' are "hold" coils, whose operation will be explained fully hereinafter in connection with the detailed explanation with regard to Fig. 5c.

Note in Figs. 5a and 5b that a limit switch 145, having contacts connected to leads z1 and z2, is provided at the top of the mechanism, which is the normal or zero position of yoke 140, and is so positioned that the control circuit for the timer, to which it is connected by means of leads z1 and z2, will be disabled should yoke 140 ever attempt to rotate more than its theoretical limit of 360 degrees. Actually, this maximum figure will be nearer 357 degrees, since at least three degrees will be required for a rigid mounting to support the internal parts of the timer, such as the motor. Such a support may be provided in the form of a sheet of metal extending from an external support to the internal parts, this sheet of metal being located within a three-degree arc through which the yoke 140 does not rotate. Thus, limit switch 145 actually will be adjusted to stop the operation of the timer should yoke 140 attempt to rotate more than 357 degrees. A block of insulation 146 is provided on yoke 140 and positioned properly to engage the movable contact of limit switch 145, and a spring 147 is provided to maintain this movable contact in engagement with its cooperating fixed contact except when also engaged by insulation block 146. A limit switch 148 is also provided adjacent the zero position of each lever 136, this limit switch 148 being shown in Figs. 5a and 5b adjacent magnet 137. The contacts of each limit switch 148 are normally held open by means of a spring 149, as shown in Fig. 5c, but are held in engagement with one another whenever the corresponding lever 136 or 136' is in its zero position, as will be pointed out hereinafter in connection with the discussion of the operation of the control system of the timer shown in Fig. 5c. These zero limit switches 148 and 148' insure that at least one of the levers 136 and 136' is in its zero position before operation of the timer can be initiated, and thus insure correct operation.

Referring now to Fig. 5c, the start terminal of the timer is connected through the contacts of limit switches 148 and 148' in parallel to one terminal of coupling condenser 150. The other terminal of coupling condenser 150 is connected to the control grid of screen grid thyratron 151. The control grid and cathode of this thyratron 151 are also coupled to ground through biasing resistors in a conventional manner as shown. The screen grid of this thyratron 151 is connected to a suitable source of positive potential through a resistor 152, and its plate is connected to the same source of positive potential through limit switch 145 and either start coil 132 or 132' depending upon the position of armature 153, whose position is determined by relay 154. The stop terminal of the timer is coupled to the control grid of a second screen grid thyratron 155 through coupling condenser 156. The control grid of thyratron 155 is also coupled to ground by a biasing resistor 157, its cathode is directly connected to ground, and its screen grid is connected to a negative source of potential through resistor 158 and to the screen grid of thyratron 151 through resistor 159. This screen grid connection between thyratrons 151 and 155 insures that "stop" tube 155 cannot fire if "start" tube 151 has not previously fired. The plate of "stop" thyratron 155 is connected to a suitable source of positive potential through armature 160 associated with relay 154 and alternatively either stop coil 134 and one of the coils of relay 154 or stop coil 134' and the other coil of relay 154. Hold coils 133 and 133' are alternately connected as shown in circuit with a source of potential 161 by means of contact 162 associated with relay 154.

The operation of the control circuit of the timer is as follows. Any pulse passed by the associated discriminator 68 (Fig. 4a) thereafter appears at the start terminal of the timer and will be coupled via coupling condenser 150 and either limit switch 148 or 148' (or both in parallel if the equipment is just being started) to trigger on "start" thyratron 151, assuming that yoke 140 (Figs. 5a–5b) is not jammed against limit switch 145 and that a positive potential is thus applied to the plate of this thyratron 151 through either start coil 132 or 132' depending upon the position of armature 153. When "start" thyratron 151 is triggered on by this initial pulse, it fires, drawing current through either start coil 132 or 132', whichever is connected in the plate circuit as above-described. For the purpose of this explanation, it will be assumed that armature 153 is in the position shown and thus current is drawn through start coil 132. Therefore, as explained above in connection with Figs. 5a–5b, ear 138 engages gear 135 and, assuming that motor 139 is rotating at its fixed speed of 1 R. P. S., lever 136 starts revolving. Thereafter, when a subsequent pulse is applied to the stop terminal of the timer from either gate circuit 82, discriminator 67, discriminator 69, discriminator 71, or discriminator 72 (Fig. 4a), this pulse is coupled to the grid of "stop" thyratron 155 via coupling condenser 156. Since "start" thyratron 151 has already been fired and is drawing current through resistor 152, the bias potential on the screen grid of "stop" thyratron 155 is reduced sufficiently due to resistor network 152, 158, and 159 shown so that the negative bias normally applied thereto by means of resistor 158 is overcome and "stop" thyratron 155 also fires. Since its plate is coupled to a suitable source of potential through armature 160, stop coil 134, and one of the coils of relay 154, the firing of "stop" thyratron 155 causes current to pass through stop coil 134 which, as explained previously in connection with Fig. 5a, withdraws ear 138 from engagement with the teeth of gear 135 and causes the opposite end of the permanent magnet arm 137 to engage with the teeth of gear 131. This same current flows through the left-hand coil of relay 154 which, as shown by its arrow, causes armatures 153, 160 and 162 to move to the right, thus de-energizing start coil 132 and stop coil 134 and energizing hold coil 133. The contacts associated with armatures 160 and 162 are so arranged that hold coils 133 and 133' are always energized before movement of armature 160 de-energizes the corresponding stop coils 134 or 134'. By choosing thyratrons 151 and 155 having a sufficiently short de-ionization time, each of these tubes ceases firing during the switching of relay armatures 153, 160 and 162 so that while current still flows through hold coil 133, both thyratrons 151 and 155 are "off" and hence no current flows through start coil 132' or stop coil 134' when the switching of these relay armatures is completed. Thereafter, when a subsequent pulse is applied from discriminator 68 (Fig. 4a) to "start" thyratron 151, current flows through start coil 132' and lever 136' is moved to an angular position, as described above in connection with Fig. 5a, whose magnitude is determined by the interval elapsing until the reception of a subsequent pulse by "stop" thyratron 155, thus causing a current to flow through stop coil 134'. This same current flows through the right-hand coil of relay 154 which, as indicated by its arrow, causes armatures 153, 160 and 162 to move back to the position shown, de-energizing start coil 132' and stop coil 134' and energizing hold coil 133' prior thereto. Again, both thyratrons 151 and 155, due to their short de-ionization time, cease firing and the cycle is then ready to begin anew upon the reception of subsequent pulses by the timer.

Note that for accurate operation of the timer its driving source, motor 139, must run at exactly the same speed as the corresponding commutators 18 and 19 and antenna 20 (Fig. 3) of the ground system. This is insured by designing both the ground station motor and the airborne motor to operate at exactly the same speed (1 R. P. S.) and supplying each of these motors from a stabilized power source, preferably stabilized by synchronized means. In the exemplified case this synchronized means is, of course, the L-band ATC pulses.

In Fig. 6 is shown one form of couting circuit which may be utilized in block 81 of Fig. 4a. As explained above, such a counting circuit is required because even directional antennas have finite beam widths, and hence several pulses of width I are received at the aircraft as the ground station directional rotating antenna 20 (Fig. 3) rotates past the aircraft. For precise measurement of the angle of the aircraft relative to the ground station, it is obvious that only the median one of these pulses received should be effective to operate the indicator of the navigation system, and this is the reason for the inclusion of counting circuit 81. All pulses of width I passed by discriminator 66 (Fig. 4a) are applied as shown to the control grid of trigger tube 165. These pulses cause trigger tube 165 to fire blocking oscillator 166, which comprises delay line 167, pulse transformer 168, and tube 169. The output of blocking oscillator 166 is fed into a step-by-step counter circuit 170, of which diodes 171 and 172 are a part and connected as shown. Thus, there is a voltage established across the condenser 173, connected between the cathode of diode 172 and ground, which is proportional to the number of pulses of width I received per second. The purpose of blocking oscillator 166 is to provide uniform pulses to the counter circuit 170 regardless of the nature of the pulses received at S-band receiver 62 (Fig. 4a). The voltage across condenser 173 is connected to the grid of tube 174 to bias this tube and thus control the amount of delay introduced by the cathode-coupled multivibrator 175, comprising tubes 174 and 176. The output of pulse width I discriminator 66 (Fig. 4a) is also connected to the grid of tube 174, and thus cathode-coupled multivibrator 175 is triggered by the first pulse of the group of pulses of width I which are received each time the rotating beam from the ground station rotating directional antenna 20 (Fig. 3) sweeps past the aircraft. The output of multivibrator 175, obtained at the plate of tube 176, is in the form of a single square wave. This square wave is converted into a pair of short pulses by means of the short time-constant or differentiating circuit comprising condenser 178 and resistor 179. The first pulse thus produced is eliminated by diode rectifier 180 connected as shown. The second pulse is negative and is passed by diode 180 to produce a positive output across its plate resistor 181. By properly proportioning the circuit parameters the output at the plate of diode 180, which is then connected to gate circuit 82 (Fig. 4a), will be delayed by a time interval equal to one-half the time required for the complete beam to sweep by the aircraft. Thus the desired result is obtained.

A more precise circuit can be made by replacing multivibrator 175 with a phantastron.

In Fig. 7 is shown one form of range tracking circuit which may be utilized in block 87 of Fig. 4a. This circuit is one form of the so-called regenerative tracking circuit, and its purpose is to convert the time interval between two pulses representing the range of the aircraft from the ground station into a voltage which is proportional to the range. This conversion is subject to the requirement that it shall not be disturbed by the presence of a third pulse. The first pulse of each pair of range pulses of width V appears at the output of altitude and lane gate circuit 85 of Fig. 4a and is coupled by means of condenser 185 to phantastron tube 186 as shown. This pulse triggers the phantastron to produce an output across cathode resistor 187 of cathode follower tube 188. Diode 189 clamps the plate of tube 186 to the voltage appearing at the upper end of resistor 190 and establishes the level from which the downward excursion of the plate voltage of tube 186 begins, thus controlling the duration of the phantastron switching action. The output of the cathode follower 188 is shaped by means of the differentiating circuit consisting of condenser 191 and resistor 192. The positive swing produced at the end of the phantastron switching action, after differentiation, triggers the succeeding blocking oscillator tube 193. The output of the blocking oscillator is limited to a positive pulse by diode 194, and this output appears across its cathode resistor 195. The purpose of blocking oscillator 193 is to sharpen the output of the phantastron. The purpose of the stages represented by tube 186, 188, 193, and 194 is to produce a pulse across resistor 195 which is delayed with respect to the original pulse at condenser 185 by a time interval proportional to the voltage across resistor 190.

The pulse appearing across resistor 195 is applied simultaneously to a delay line 196 and to the grid of triode 197, which with triode 198 forms a "flip-over" circuit. This pulse cuts off tube 198, which is normally "on," or conducting. When a negative pulse returns after reflection from the "far" end of the delay line 196, tube 197 is cut off and tube 198 is restored to a conducting condition. There is thus generated at the plate of tube 198 a gating voltage, the duration of which is equal to the time required for a pulse to travel down the delay line 196 and return. For illustrative purposes, this time will be taken as 25 micro-seconds. The gating voltage produced at the plate of tube 193 is applied to the screen grid of pentode 199. The output of gate circuit 86 (Fig. 4a) is coupled to the control grid of pentode 199 by means of condenser 200. If the delay time is correct, pentode 199 will pass the second pulse of the pair of range pulses of width V when it appears at the output of gate circuit 86 (Fig. 4a). The negative output produced by pentode 199 is inverted by tube 201, the positive output of which is supplied to the screen grids of pentodes 202 and 203 in parallel. The control grids of pentodes 202 and 203 are biased so that when single-shot multivibrator 204 composed of tubes 205 and 206 is in its quiescent state with tube 206 conducting, pentode 203 produces a negative pulse at its plate and pentode 202 produces no output when the above-mentioned positive pulse from tube 201 is applied to their screen grids. The "far" end of delay line 196 is connected to the grid of tube 205 through condenser 207 as shown. Thus, each pulse applied to the "near" end of the delay line 196 (which is connected to the grid of tube 197) arrives at the "far" end of delay line 196 at a time representing the mid-point of the 25 microsecond gate (12½ microseconds) and is applied as a trigger to the grid of tube 205. Tube 206 is then cut off and tube 205 begins conducting. After a time greater than the length of the gate generated by tube 198, single-shot multivibrator 204 recovers and returns to its quiescent state. The negative gate generated at the plate of tube 205 is applied to the control grid of tube 203 and makes it incapable of producing an output while tube 205 is conducting. Similarly, the positive gate produced at the plate of tube 206 is applied to the control grid of tube 202 and makes it capable of producing a negative pulse at its plate in response to a positive pulse on its screen grid during the interval during which tube 206 is cut off and tube 205 is conducting. Each negative output pulse produced by tube 202 charges condenser 208 by the action of diode 209 and raises the potential of the grid of cathode follower 210, whose cathode is connected to ground through resistor 199. Each negative output pulse produced by tube 203 removes charge from condenser 208 by the action of diode 211 and reduces the potential of the grid of cathode follower 210. Thus, if the second pulse of the pulse pair of width V arrives via gate circuit 86 (Fig. 4a) before the delayed pulse triggers the single-shot multivibrator 204, i. e., during the first half of the 25 microsecond gate, tube 203 produces an output, and the voltage on the grid of cathode follower 210 and hence across its cathode resistor 199 is decreased. Decrease in the voltage across resistor 190 decreases the delay of phantastron 186 and causes the 25 microsecond gate to occur earlier. If, on the other hand, the second pulse of the pulse pair of width V arrives after the delayed pulse triggers the single-shot multivibrator 204, i. e., during the second half of the 25 microsecond gate, tube 202 produces an output, and the potential on the grid of cathode follower 210 and hence across its cathode resistor 190 is increased. The increased voltage across resistor 190 increases the delay of phantastron 186 and causes the 25 microsecond pulse to occur later. The net effect is to center the output of gate circuit 86 in the 26 microsecond gate. Since the delay in the phantastron circuit is proportional to the voltage across resistor 190, and since this delay equals the spacing between the pulses from the gate circuits 85 and 86 (Fig. 4a) [and hence from the range discriminators 70 and 88 of Fig. 4a], the voltage across resistor 190 is proportional to the spacing between the range pulses. This voltage, which, as explained, is variable in accordance with the spacing between the range pulses, is then connected to the plate of the phantastron tube of block 122 of Fig. 4a to control the intensification of the beam of the cathode ray tube indicator 1 (Fig. 4b) at the proper time to indicate the range of the aircraft relative to the ground station at C (Fig. 1).

Tubes 212 and 213 constitute a free-running multi-vibrator 214 with a period, say, of 10 seconds which supplies a square wave to the grid of tube 215. The plate of tube 215 is connected to the grid of cathode follower 210 by means of relay contacts 216. When the range tracking circuit is first put in operation, these contacts 216 are closed and the output of tube 215 generates a saw-tooth wave across the condenser 208 and thus across resistor 190. This saw-tooth voltage sweeps the 25 microsecond gate slowly through the interval in which the second pulse of the range pair of width V is expected. When a pulse arrives within the 25 microsecond gate, a positive pulse is produced by tube 201, which puts a charge on condenser 217 through tube 218. When three or four charges have accumulated on condenser 217, the potential at the grid of tube 219, to which it is connected via resistor 220, is sufficiently high to cause the current flowing through the tube, and hence through coil 221 of the relay in its cathode circuit, to open the associated relay contacts 216. This interrupts the search voltage and permits the tracking circuit to lock in on the second pulse. Thereafter, operation of the tracking circuit continues as above-described as the range of the aircraft relative to the ground station varies due to the continued flight of the aircraft along its course.

In Fig. 8 is shown a modification of the presentation illustrated in Fig. 1 in that the air lane is divided horizontally into more than two parallel lanes. With the equipment thus far described the operator of an aircraft merely knew whether he was flying to the right or to the left of the center line of the air lane as determined by the position of the dot 5, representing his aircraft, relative to secondary leg trace 2 and primary leg trace 4. As shown in Fig. 8, each altitude zone of an air lane block can be further divided by including additional indicia 225—228. Thus, the pilot of the hypothetical aircraft with which we are presently concerned, when looking at his indicator according to Fig. 8, would immediately see that he was flying in the extreme right-hand horizontal lane of his particular altitude zone, since the dot 5 representing his aircraft lies to the right of indicia 227 provided on the indicator.

These additional indicia may be provided in a variety of ways. The simplest is merely by means of an overlay of some transparent material on which are reproduced the lines 225 and 227 and a centering mark, so that this overlay can be positioned above the cathode ray tube indicator 1 and lined up with the center C and the secondary leg trace 2. A second piece of transparent material containing lines 226 and 228 and a similar centering guide would be placed over the first piece of transparent material above-described and lined up with the center C and primary leg trace 4 in order that the composite picture shown in Fig. 8 would be produced. Each overlay should comprise two pieces of transparent material, each containing its parallel lines 225 and 227 or 226 and 228, since the angle between the primary and secondary legs of the air lane changes from block to block and hence reorientation of the angular position of these transparent pieces of material is necessary whenever a block boundary is passed by the aircraft.

Another way of producing these indicia is by mechanically or electronically producing sweep voltages of varying bias and applying these to deflecting elements of the cathode ray tube indicator 1 to produce traces corresponding to lines 225—228. Note that both methods thus far described require a knowledge at the aircraft of the lane width of each block or the establishment of a uniform lane width along the entire air lane so that a single overlay spacing or a single sweep bias setting can be utilized.

Still another method which is not subject to this requirement of constant lane widths would be to use a video map at each ground station of its horizontal air lane boundaries and scan this by means of a photocell, thereafter transmitting the photocell output from the ground station to the aircraft and translating the signals thus received at the aircraft into a corresponding video map on the aircraft cathode ray tube indicator 1 to produce indicia 225—228.

It is also desirable that an automatic signal be transmitted by each aircraft within a block for reception at the ground station of that block and defining the particular horizontal air lane in which the aircraft is located. This can be accomplished by transmitting from each aircraft signals defining its position in the horizontal air lanes for reception by the ground station navigation system according to this invention, these signals being similar to the reply signals transmitted for reception by the cooperating ATC system defining the position of the aircraft in vertical altitude zones. A simple form of airborne control circuit for the aircraft to accomplish this result is shown in Fig. 9. Mechanical inputs A—C and electrical inputs D—G are obtained from the corresponding marked points on the airborne equipment shown diagrammatically in Figs. 4a–4b. Trigger signals applied to slider 230 of commutator 231 will be used to trigger control circuits controlling the signal output of a cooperating airborne transmitter to denote whether the aircraft is in horizontal air lane +1, +2, −1, or −2, according to the position of commutator 231 and armatures 232 and 233 of relay 234. By horizontal air lane +1 is meant the lane defined between secondary leg trace 2 and indicia 227, and primary leg trace 4 and indicia 228 of Fig. 8. By horizontal air lane +2 is meant the space to the right of indicia 227 and 228 of Fig. 8. Horizontal air lanes −1 and −2 are defined similarly, lane −2 lying to the left of indicia 225 and 226.

Commutator 231 is composed of two inner rotatable segments 235 and 236, each covering approximately 180 degrees and their angular position being controlled by the mechanical output of airway timer 77 of Fig. 4a so that adjacent ends of segments 235 and 236 are disposed at an angle φ with the vertical downwardly extended dotted line shown, this angle φ being the same as the angle φ of Fig. 1. Two additional fixed segments 237 and 238, each covering approximately 90 degrees, are disposed adjacent one another outside segments 235 and 236 and have their remote ends connected to the latter by means of slider contacts 239 and 240 as shown. The adjacent ends of segments 237 and 238 are connected through armatures 241 and 242 of "sense" switch 80 to armatures 232 and 233 respectively of relay 234. Disposed outside of the segments thus far described is a rotatable ring 243 having a slider contact 244, whose position relative to the other segments is controlled by means of the mechanical output of aircraft timer 78 of Fig. 4a. The output of timer 78 always maintains slider contact 244 at an angle a relative to the vertical downwardly extending dotted line shown, this angle a also being the same as the angle a of Fig. 1. Slider 230 bears against the periphery of ring 243 at any convenient point.

Assuming as before that the aircraft is flying in a generally northerly direction along a generally northerly-southerly airway, armatures 241 and 242 of "sense" switch 80 would be in the position shown. Thus, each trigger applied to input slider 230 of commutator 231 would be coupled via ring 243, slider contact 244, segment 238, and armature 241 to armature 232 of relay 234, thus fixing that the signal sent by the airborne transmitter (not shown) shall denote that the aircraft is in one of the plus lanes, +1 or +2, as determined by relay 234, whose operation will be described hereinafter. If the aircraft, on the other hand, were in one of the minus lanes, slider contact 244 would be moved by timer 78 (Fig. 4a) so that it contacted either segment 235 or 237, depending upon the position of the aircraft, and thus input triggers would be connected to actuate only the minus control circuits of the airborne transmitter. The operation of "sense" switch 80 is the same and is included for the same reasons as that above-described in connection with Fig. 4a.

In order to operate relay 234 to indicate whether the aircraft is in a number 1 or number 2 zone, pairs of pulses of width I will be sent up by the ground station each time, instead of single pulses as shown in Figs. 2a–2c. One way that the proper spacing between the pulses of each pair can be determined at each particular angular position of the directional antenna 20 (Fig. 3) is by the output taken from a photocell scanning a video map of the horizontal air lane boundaries adjacent the ground station. This video map would look like the cathode ray tube indicator picture shown in Fig. 8 with the trace 5 and heading marker 8 removed. Since the pulses of width I are transmitted by the ground station from a directional rotating antenna 20 (Fig. 3), only pulse pairs corresponding approximately to the angular position of the aircraft relative to the secondary leg of the air lane will be received at the aircraft. Note that several pulse pairs of width I will be received as the rotating directional antenna 20 (Fig. 3) sweeps past the aircraft for the reasons discussed above in connection with Fig. 5, and hence it will be necessary to pick out the median pair of pulses of width I. By utilizing the same time interval-distance scale for pulse pairs of width V and width I, the comparison of the time interval between the pulses of width I of the median pair and the interval between the pulses of width V for the particular altitude zone in which the aircraft is located, denoting its range, is an indication at the aircraft whether it lies in a number 1 or number 2 zone. Thus the maximum interval between pulses of any pulse pair of width I will also be 125 microseconds.

The remaining equipment shown diagrammatically in Fig. 9 is electronic equipment utilized to position armatures 232 and 233 according to whether the second pulse of the pulse pair of width I is delayed after its initial pulse more or less than the second pulse of the pulse pair of width V. All S-band pulses received by S-band receiver 62 of Fig. 4a are connected through connection F to the input of discriminator 245, which passes only pulses of width I. Since this input to discriminator 245 is taken before the pulses pass through gated stage 64 of Fig. 4a, both pulses of each pulse pair of width I will appear at the output of discriminator 245. The input of gated stage 246 is connected to the output of discriminator 66 of Fig. 4a by means of connection D, and hence only the initial pulse of each pulse pair of width I will appear at its input. Gated stage 246 is turned "on," or conducting, from the output of gate circuit 82 of Fig. 4a via connection E. The output at E of Fig. 4a is a pulse voltage produced at the time when the median one of the initial pulses of each pulse pair of width I is received at the aircraft as described above in connection with Fig. 6. Thus, gated stage 246 is turned "on" just in time to pass the initial pulse of the median pair of width I, and this initial pulse is then connected to the inputs of phantastron and differentiator 247 and gated stage 248 in parallel. This input to gated stage 248 renders it conducting for 125 microseconds thereafter, and therefore the second pulse of the median pair of width I will be passed thereby. This second pulse of the median pair of width I is then connected back to gated stage 246 to close this latter stage and prevent any further pulses of width I from operating gated stage 248 or phantastron 247 until the next time the ground station directional rotating antenna 20 (Fig. 3) sweeps past and renders gated stage 246 "on" again. Phantastron 247 is also supplied with a voltage from range tracking circuit 87 of Fig. 4a via connection G, this voltage being proportional to the horizontal range of the aircraft from the nearest ground station, as above-described in connection with Fig. 7. The output from phantastron and differentiator 247 is thus a pair of pulses as indicated, the spacing between these pulses as a fraction of 125 microseconds being a measure of the horizontal range of the aircraft from the nearest ground station. These pulses are coupled by means of condenser 249 to tube 250. Tube 250, together with tube 251, constitute an Eccles-Jordan multivibrator circuit 252, and the output from gated stage 246 is connected to the grid of tube 251 via condenser 253. The output taken from the plate of tube 250 is connected to the screen grid of screen grid thyratron 254. Similarly, the output of tube 251, taken from its plate, is connected to the screen grid of screen grid thyratron 255. In the absence of an output from either tube 250 or 251, thyratrons 254 and 255 are biased "off," or non-conducting, by means of a biasing source connected at terminal 256. The output of gated stage 248 is coupled to the control grids of thyratrons 254 and 255 in parallel via condenser 257. One coil of relay 234 is connected in series in the plate circuit of thyratron 254 and the other coil of relay 234 is similarly connected in series in the plate circuit of thyratron 255. Current flowing through either of these coils of relay 234 will move their armatures 232 and 233 in the direction shown by the respective arrows, and this relay is of the "mag. stick" type. In other words, momentary excitation of either one of its coils will move its armatures 232 and 233 in the direction indicated by the arrow, and these armatures will thereafter remain in that position until moved by momentary excitation of the other coil. The plate voltage source for thyratrons 254 and 255 is further connected through both the armature 258 and coil 259 of another relay as shown, so that whenever either thyratron fires, resulting in momentary excitation of the corresponding coil of relay 234, armature 258 will be drawn upward against the force of spring 260, thus removing the plate supply from whichever thyratron has fired and rendering that thyratron non-conducting and ready for another cycle of operation.

As explained above, the output of gated stage 246 is the initial pulse of each median pair of width I transmitted by the ground station at the time the ground station directional rotating antenna 20 (Fig. 3) is "looking" at the aircraft, and this triggers "on" tube 251 of the Eccles-Jordan circuit 252. This results in a negative gate pulse being applied to the screen grid of thyratron 255, biasing this thyratron further negative so that it cannot conduct even though a pulse from gated stage 248 is applied to its control grid. Tube 250, on the other hand, is not conducting, and hence thyratron 254 can be triggered "on" by any pulse applied to its control grid from gated stage 248. This condition obtains until a positive trigger is applied to tube 250 of the Eccles-Jordan circuit 252, and this will occur at a time proportional to the range of the aircraft relative to the nearest ground station as above-described.

If the aircraft is in a Number 1 zone, the second pulse of the median pair of width I will be applied to the control grid of thyratron 255 from the output of gated stage 248 after tube 250 is thus triggered on. This will cause thyratron 255 to fire and momentarily cause current to flow in the lower coil of relay 234, moving armatures 232 and 233 to the downward position if they are not already in that position. As explained above, firing of thyratron 255 causes relay 259 to pull its armature 258 upward, thus disconnecting the plate supply from thyratron 255 and immediately rendering this tube non-conducting again.

If, on the other hand, the aircraft were in a number 2 zone, the second pulse of the median pair of width I would be applied to the grids of thyratrons 254 and 255 in parallel before the output of phantastron and differentiator 247 had rendered tube 250 conducting and thus tube 251 non-conducting. Since whenever tube 251 conducts it biases thyratron 255 further negative, the bias on thyratron 254 at the same time being reduced so that it may potentially fire, this pulse of width I will trigger thyratron 254 on, causing current to flow through the upper coil of relay 234 and moving armatures 232 and 233 into their upward position, as shown. There is thus illustrated a system which will control an airborne transmitter to indicate, to a ground station, in which of a plurality of horizontal air lanes at a particular altitude zone the aircraft bearing the transmitter is located.

Note that if only two horizontal air lanes are utilized, as illustrated in Fig. 1, either the mechanical components or the electronic components of Fig. 9 may be used alone and only single pulses of width I need be transmitted instead of pulse pairs. Thus, utilizing the mechanical components alone, the lead connected to armature 232 would be connected to the "right" control circuit of the airborne transmitter and the lead connected to armature 233 would be connected to the "left" control circuit of the airborne transmitter. By "right" and "left" is meant, of course, whether the aircraft is located to the right or the left of the center line of the airway as viewed from above.

Similarly, by triggering tube 251 "on" by means of each pulse of width III from discriminator 68 of Fig. 4a and applying the pulse width IV output of discriminator 69 of Fig. 4a to the grid of tube 250, together with the pulse width $I_a$ output of gate circuit 82 of Fig. 4a to the control grids of thyratrons 254 and 255 in parallel, it can be shown that the outputs produced by thyratrons 254 and 255 indicate whether the aircraft similarly is either left or right of the air lane.

While no control circuits for the sweep circuits of the cathode ray tube indicator I are shown in Fig. 9, it will be apparent that by suitable modification, sweep circuit control can be provided to produce indicia 225—228 as shown in Fig. 8. If a uniform lane width is utilized along the entire air lane, the simplest way of producing these visual indicia in cooperation with the equipment shown diagrammatically in Fig. 9 is, of course, by the use of an overlay as above-described.

Numerous additional applications of the above-described principles will occur to those skilled in the art and no attempt has been made here to exhaust such possibilities. The scope of this invention is defined in the following claims.

What is claimed is:

1. The combination of an omni-directional antenna, a transmitter connected to said omni-directional antenna for transmitting pulses at a fixed frequency, a modulator connected to said transmitter for controlling the pulses transmitted, a directional antenna, a second transmitter connected to said directional antenna for transmitting pulses at the same frequency as that of said first-mentioned transmitter, a modulator connected to said second transmitter for controlling its pulses, a control circuit for both said modulators comprising first and second segmented commutators similar to one another and each having a slider, a constant speed driving source for rotating said directional antenna and the sliders of said commutators at the same speed in synchronism, a source of trigger pulses and a double pulse generator, the slider of said first commutator being connected to said source of trigger pulses, certain of the segments of said first commutator being connected to various inputs of said first-mentioned modulator to produce pulses of widths distinctive from one another therefrom in succession as determined by the relative positions of the corresponding commutator segments and in response to the trigger pulses, and the other segments of said first commutator being connected to the input of said last-mentioned modulator to produce an output therefrom in response to said trigger pulses whenever an output is not being produced from said first-mentioned modulator, and the slider of said second commutator being connected to said double pulse generator and segments of said second commutator corresponding to the segments of said first commutator which are connected to said last-mentioned modulator being connected together and to another input of said first-mentioned modulator to produce an output therefrom comprising a pair of pulses, the first of which occurs substantially simultaneously with a pulse output from said last-mentioned modulator, in response to each set of double pulses from said double pulse generator.

2. Apparatus according to claim 1 wherein one of said certain segments of said first commutator is connected only to one input of said first-mentioned modulator which produces a characteristic pulse distinctive from all other pulses produced by either of said modulators and said last-mentioned segment of said first commutator is positioned to be contacted by said slider thereof only when said directional antenna, whose movement is synchronized with said slider, is aligned with a fixed reference.

3. Apparatus according to claim 2 wherein the initial pulse from said omni-directional antenna constitutes said characteristic pulse, the spacing between said initial omni-directional pulse and one subsequent omni-directional pulse denotes direction information, the spacing between said initial pulse and another of the subsequent omni-directional pulses denotes distance information, the spacing between the omni-directional pulses of each said pair of pulses denotes additional distance information, the pulses produced by said last-mentioned modulator under control of said other segments of said first commutator are each of equal width but distinctive from the width of any of the other pulses produced by either of said modulators, and similarly the pulses of each pulse pair produced by said last-mentioned modulator are each of equal width but distinctive from the width of any of the other pulses produced by either of said modulators, comprising a receiver tuned to said fixed frequency for receiving said pulses, a plurality of discriminators connected to the output of said receiver, one for each distinctive pulse width transmitted at said fixed frequency and each passing only its specified pulse width, a plurality of timers, one each for said direction information omni-directional pulses, said distance information omni-directional pulses, and said directionally transmitted pulses, respectively, and each including a mechanical output element, the discriminator which passes only the distinctive pulse width of the initial omni-directional pulse being connected to all said timers in parallel to initiate their operation and the other discriminators each being connected to a corresponding timer to stop the operation of the latter and produce a mechanical output therefrom proportional to the time interval between the reception of the initial omni-directional pulse and the pulse which stops the operation of that timer, a sine-co-sine resolver connected to the timer whose output represents a direction indication carried by the omni-directional pulses, a sine-co-sine resolver connected to the timer whose operation is stopped by the distinctive pulse width of said directionally transmitted pulses, which directionally transmitted pulses are received only as said directional antenna sweeps past said receiver, a linear potentiometer connected to the timer whose output represents a distance indication carried by the omni-directional pulses, a second discriminator passing only the distinctive pulse width of the pulses of said pulse pair, a timing circuit whose operation is initiated by the first of said discriminators passing only the distinctive pulse width of the pulses of said pulse pair and stopped by the second such discriminator, a cathode ray tube indicator including horizontal and vertical deflecting elements and a beam intensifying element, a sweep circuit for and connected to each of said horizontal and vertical deflecting elements, a multivibrator connected to the linear potentiometer and the duration of whose output is controlled thereby, and three commutators each including a slider, the slider of one of said commutators being connected to said beam intensifying element and the sliders of the other two commutators being connected to said horizontal and vertical sweep circuits, respectively, the sine and co-sine outputs of said resolvers being respectively connected to corresponding segments of said commutators whose sliders are connected to said sweep circuits in order to deflect the cathode ray tube beam at angles determined by the resolver mechanical outputs in succession as the sliders traverse the successive commutator segments, and the output of said multivibrator and said timing circuit being connected to respective corresponding segments of the commutator whose slider is connected to said beam intensifying element to intensify each trace whose angular position is determined by the other commutators as determined by the output of said multivibrator and said timing circuit.

4. Apparatus according to claim 1, wherein the spacing between the initial pulse from said omni-directional antenna and one subsequent omni-directional pulse denotes direction information, the spacing between said initial pulse and another of the subsequent omni-directional pulses denotes distance information, the spacing between the omni-directional pulses of each said pair of pulses denotes additional distance information, the pulses produced by said last-mentioned modulator under control of said other segments of said first commutator are each of equal width but distinctive from the width of any of the other pulses produced by either of said modulators, and similarly the pulses of each pulse pair produced by said last-mentioned modulator are each of equal width but distinctive from the width of any of the other pulses produced by either of said modulators, comprising a receiver tuned to said fixed frequency for receiving said pulses, a plurality of discriminators connected to the output of said receiver, one for each distinctive pulse width transmitted at said fixed frequency and each passing only its specified pulse width, a plurality of timers, one each for said direction information omni-directional pulses, said distance information omni-directional pulses, and said directionally transmitted pulses, respectively, and each including a mechanical output element, the discriminator which passes only the distinctive pulse width of the initial omni-directional pulse being connected to all said timers in parallel to initiate their operation and the other discriminators each being connected to a corresponding timer to stop the operation of the latter and produce a mechanical output therefrom proportional to the time interval between the reception of the initial omni-directional pulse and the pulse which stops the operation of that timer, a sine-co-sine resolver connected to the timer whose output represents a direction indication carried by the omni-directional pulses, a sine-co-sine resolver connected to the timer whose operation is stopped by the distinctive pulse width of said directionally transmitted pulses, which directionally transmitted pulses are received only as said directional antenna sweeps past said receiver, a linear potentiometer connected to the timer whose output represents a distance indication carried by the omni-directional pulses, a second discriminator passing only the distinctive pulse width of the pulses of said pulse pair, a timing circuit whose operation is initiated by the first of said discriminators passing only the distinctive pulse width of the pulses of said pulse pair and stopped by the second such discriminator, a cathode ray tube indicator including horizontal and vertical deflecting elements and a beam intensifying element, a sweep circuit for and connected to each of said horizontal and vertical deflecting elements, a multivibrator connected to the linear potentiometer and the duration of whose output is controlled thereby, and three commutators each including a slider, the slider of one of said commutators being connected to said beam intensifying element and the sliders of the other two commutators being connected to said horizontal and vertical sweep circuits, respectively, the sine and co-sine outputs of said resolvers being respectively connected to corresponding segments of said commutators whose sliders are connected to said sweep circuits in order to deflect the cathode ray tube beam at angles determined by the resolver mechanical outputs in succession as the sliders traverse the successive commutator segments, and the output of said multivibrator and said timing circuit being connected to respective corresponding segments of the commutator whose slider is connected to said beam intensifying element to intensify each trace whose angular position is determined by the other commutators as determined by the output of said multivibrator and said timing circuit.

5. Apparatus according to claim 1 wherein said connected-together segments of said second commutator are connected to the input of said first-mentioned modulator through a delay circuit, whereby the first pulse of each pair of pulses produced from said first-mentioned modulator is delayed by a time fixed by said delay circuit after the corresponding pulse produced at the output of said last-mentioned modulator and the second pulse of said pulse pair is delayed after the initiating trigger pulse derived from said second commutator by the same time fixed by said delay circuit.

6. Apparatus according to claim 1 wherein said source of trigger pulses comprises the signal system of an airway traffic control system which also provides voltages proportional to the slant range to aircraft adjacent the airway traffic control system and the airway traffic control system includes range tracking circuits having their inputs supplied by said last-mentioned voltages and means for converting slant range into horizontal range for known altitudes controlled by said range tracking circuits, the output of said last-mentioned means being connected to said double pulse generator to control the spacing between the pulses of each pulse pair output thereof.

7. Apparatus for producing a visual indication of direction and distance information transmitted at a first frequency in the form of a plurality of pulses, each of distinctive width, the spacing between the initial pulse and one subsequent pulse denoting direction information and the spacing between the initial pulse and another of the subsequent pulses denoting distance information, and the transmission of each pulse being synchronized with the transmission of a pulse at a second frequency, comprising a receiver tuned to said first frequency for receiving said plurality of pulses, a gated stage controlled by a receiver tuned to said second frequency, the output of said receiver tuned to said first frequency being passed through said gated stage so that only those pulses of said first frequency which are transmitted substantially simultaneously with a corresponding pulse of said second frequency are passed thereby, a plurality of discriminators connected to the output of said gated stage, one for each distinctive pulse width transmitted at said first frequency and each passing only its pulse width, a plurality of timers, one each for said direction information pulses and said distance information pulses, respectively, and each including a mechanical output element, the discriminator which passes only the distinctive pulse width of the initial pulse being connected to all said timers in parallel to initiate their operation and the other discriminators each being connected to a corresponding timer to stop the operation of the latter and produce a mechanical output therefrom proportional to the time interval between the initial pulse transmitted at said first frequency and the pulse which stops the operation of that timer, a sine-co-sine resolver for and connected to the timer whose output represents a direction indication carried by the transmitted pulses, a linear potentiometer for and connected to the timer whose output represents a distance indication carried by the transmitted pulses, a cathode ray tube indicator including horizontal and vertical deflecting elements and a beam intensifying element, a sweep circuit for and connected to each of said horizontal and vertical deflecting elements, a multivibrator for and connected to the linear potentiometer and the duration of whose output is controlled thereby, and three commutators each including a slider, the slider of one of said commutators being connected to said beam intensifying element and the sliders of the other two commutators being connected to said horizontal and vertical sweep circuits respectively, the sine and co-sine outputs of said resolver being respectively connected to corresponding segments of the commutators whose sliders are connected to said sweep circuits in order to deflect the cathode ray tube beam at an angle determined by the resolver mechanical output as the sliders traverse said corresponding commutator segments, and the output of said multivibrator being connected to a corresponding segment of the commutator whose slider is connected to the beam intensifying element to intensify each trace whose angular position is determined by the other commutators for a length determined by the output of the multivibrator proportional to said distance indication.

8. Apparatus according to claim 7 for also producing a visual indication of the bearing of said receiver tuned to said first frequency relative to a reference fixed by the time of transmission of the initial pulse of the plurality of pulses transmitted at said first frequency, as determined by the time of reception at said receiver of additional pulses of a distinctive width emitted in a directional rotating beam which sweeps past said receiver and each additional pulse being transmitted substantially simultaneously with a transmission of a pulse at said second frequency, comprising a discriminator passing only the distinctive pulse width of said additional pulses and connected to the output of the said gated stage, a counter circuit for counting the number of said additional pulses received as the directional rotating beam sweeps past said receiver and passed by said discriminator and producing an output coincident with the median one of said additional pulses so passed, a timer whose operation is initiated by the output of said discriminator which passes only the distinctive pulse width of said initial pulse and whose operation is stopped by the output of said counting circuit, and a sine-co-sine resolver connected to said sweep circuits through said other two commutators and controlled by the output of said timer to modify the outputs of said sweep circuits which apply the resultant outputs to the deflecting elements of said cathode ray tube indicator to deflect the cathode ray tube beam at an angle determined by the time of reception of said median pulse relative to said initial pulse.

9. Apparatus according to claim 8 for transmitting a pulse output characteristic of the bearing of said receiver tuned to said first frequency with respect to said reference relative to the direction with respect thereto transmitted by means of said plurality of pulses at said first frequency, comprising a transmitter for transmitting pulses of either one of two distinctive characteristics and a control circuit connected to said transmitter and whose operation is varied in accordance with the relative outputs of the timer whose output is stopped by said median pulse and the timer whose output is stopped by the pulse of the distinctive width corresponding to said direction indication to trigger said transmitter to produce a pulse of the predetermined characteristic of said two distinctive characteristics corresponding to that timer output which is greater.

10. Apparatus according to claim 9 for also producing a visual indication of additional distance information transmitted at said first frequency in the form of a pair of pulses of distinctive width whose spacing is determined by said additional distance information and the initial pulse of the pulse pair being transmitted substantially simultaneously with the transmission of a pulse at said second frequency, comprising a first discriminator passing only the distinctive pulse width of the pulses of said pulse pair and connected to the output of said gated stage for passing only the initial pulse of said pulse pair, a timing circuit connected to said first discriminator and whose operation is initiated thereby, a second discriminator passing only the distinctive width of the pulses of said pulse pair connected to the output of said receiver tuned to said first frequency to pass both pulses of said pulse pair, a gate circuit connected to said second discriminator and controlled by the output of said first discriminator to pass only pulses occurring after said initial pulse and within a time interval fixed by the maximum predetermined spacing between the pulses of pulse pairs transmitted at said first frequency, the output of said gate circuit being connected to said timing circuit to stop its operation and produce thereby a voltage output proportional to said additional distance information, and said voltage output being applied to the beam intensifying element of said cathode ray tube indicator to produce an intensified trace on the time sweep base thereof indicating the distance represented by the spacing between the pulses of the pulse pair.

11. Apparatus according to claim 8 for transmitting a pulse output characteristic of the bearing of said receiver tuned to said first frequency with respect to said reference relative to the direction with respect thereto transmitted by means of said plurality of pulses at said first frequency, comprising a transmitter for transmitting pulses of either one of two distinctive characteristics and a control circuit connecting said transmitter and said receiver tuned to said first frequency and whose operation is varied in accordance with the time of reception of said median pulse at said last-mentioned receiver relative to the time of reception of the pulse of the distinctive width corresponding to said direction indication to trigger said transmitter to produce a pulse of the predetermined characteristic of said two distinctive characteristics corresponding to that one of said last-mentioned pulses which is received first.

12. Apparatus according to claim 7 for also producing a visual indication of the bearing of said receiver tuned to said first frequency relative to a reference fixed by the time of transmission of the initial pulse of the plurality of pulses transmitted at said first frequency, as determined by the time of reception at said receiver of additional pulses of a distinctive width emitted in a directional rotating beam which sweeps past said receiver and each additional pulse being transmitted substantially simultaneously with a transmission of a pulse at said second frequency, comprising a discriminator passing only the distinctive pulse width of said additional pulses and connected to the output of the said gated stage, a timer whose operation is initiated by the output of said discriminator which passes only the distinctive pulse width of said initial pulse and whose operation is stopped by the output of said discriminator which passes only the distinctive pulse width of said additional pulses, and a sine-co-sine resolver connected to said sweep circuits through said other two commutators and controlled by the output of said timer to modify the outputs of said sweep circuits which apply the resultant outputs to the deflecting elements of said cathode ray tube indicator to deflect the cathode ray tube beam at an angle determined by the time of reception of said additional pulses relative to said initial pulse.

13. The combination of a pulse receiver for receiving two spaced pulses and a timer connected to and under control of said receiver and including a constant speed drive source and a mechanical angular indicator output element connected to be driven by said drive source during the operation of said timer, the operation of said timer being initiated by the first of said spaced pulses and stopped by the second of said spaced pulses, whereby when the interval between said two spaced pulses represents an angular indication between two spaced segments of a commutator scanned by a slider connecting a trigger source to the transmitter transmitting said two spaced pulses and rotating at the same speed as that at which said constant speed drive source rotates, the output of said timer is equal to the angle between said two spaced commutator segments.

14. The combination of a pulse transmitter, a trigger generator, a control circuit including a commutator having two segments spaced apart and each connected to said transmitter and a slider for contacting said spaced segments connected to said trigger generator and means for rotating said slider at a constant speed to trigger said transmitter to produce two pulses spaced apart by a time interval which is a function of the distance between said two spaced segments of said commutator relative to the total distance of said commutator traversed by said slider during a cycle of its rotation, a pulse receiver for receiving said two spaced pulses, and a timer connected to said receiver and including a constant speed drive whose speed of rotation is equal to that of said commutator slider and a mechanical angular indicator output element connected to be driven by said constant speed drive during the operation of said timer, the operation of said timer being initiated by the first of said spaced pulses and stopped by the second of said spaced pulses, whereby the output of said timer is a measure of the distance between said two spaced commutator segments.

15. Apparatus for controlling airway traffic along or adjacent the primary and secondary legs of an airlane abutting at a ground station comprising means at said ground station for transmitting series of pulses omni-directionally at a first frequency for reception by aircraft, each series comprising a sync pulse followed by a plurality of time-displaced channel pulses, different channel pulses of each series being intended for reception only by aircraft at different altitudes and corresponding channel pulses of different series being intended for reception only by aircraft at the same altitude and therefore distinctive of that altitude, means at an aircraft adjacent said ground station for receiving said pulses, means at the aircraft for transmitting a reply pulse in response to each altitude-distinctive pulse intended for aircraft at its altitude, means at the ground station for receiving said reply pulses, means at the ground station for determining the altitude of the aircraft relative thereto by comparing each reply pulse with the corresponding altitude-distinctive pulse to which it constitutes a reply, means at the ground station for computing the slant range to the aircraft by means of the time difference between each altitude-distinctive pulse and the associated reply pulse, means at the ground station for transmitting omni-directionally at a second frequency three additional pulses, each substantially simultaneously with one of said altitude-distinctive or sync pulses, the first denoting the secondary leg of the airlane at the ground station and the time interval between the first and second and second and third pulses being respectively proportional to the angle of the secondary leg of the airlane with respect to a fixed reference and the angle of the primary leg of the airlane with respect to said fixed reference, and a pair of pulses, the first of which occurs substantially simultaneously with an altitude-distinctive pulse corresponding to the altitude from which reply pulses from the aircraft have been received and the interval between the pulses of said pair of pulses being proportional to the range from the ground station to that aircraft as determined at the ground station, means at the ground station including a rotating directional antenna for transmitting additional pulses directionally at said second frequency substantially simultaneously with all other sync and altitude-distinctive pulses transmitted by the ground station, means synchronizing the rotation of said directional antenna with said first-mentioned second frequency transmitting means to position said antenna pointing in the direction of said secondary leg of the airlane at the ground station only when the first of said three additional pulses is being transmitted omni-directionally, means at the aircraft for receiving said pulses of said second frequency, means for converting the spacing between said first and second additional omni-directional pulses thereof, between said second and third additional omni-directional pulses thereof, and between the pulses of said omni-directional pair of pulses thereof into indications of the angular position of the secondary leg of the airlane with respect to said fixed reference, the angular position of the primary leg of the airlane with respect to said fixed reference, and the range of the aircraft from the ground station, respectively, and means for converting said directional pulses received whenever the directional beam of said rotating antenna sweeps past the aircraft into an indication of the angular position of the aircraft relative to the secondary leg by comparing the times of reception of the omni-directional pulse corresponding to the secondary leg and of said directional pulses.

16. Apparatus according to claim 15 wherein said last-mentioned converting means at the aircraft includes means for counting the number of directional pulses received as the directional beam of said rotating antenna sweeps past the aircraft, means for producing an output coincident with the median one of the received directional pulses, and means for measuring the time interval between said output and the reception of the omni-directional pulse corresponding to the secondary leg to provide an accurate indication of the angular position of the aircraft relative to the secondary leg.

17. Apparatus according to claim 15 including a video map of the ground station and the area adjacent thereto and having boundaries dividing said area into a plurality of lanes substantially parallel to said airlane, means for scanning said video map radially from the representation thereof of said ground station, means at the ground station including a second directional rotating antenna for transmitting in a second directional rotating beam which rotates in synchronism with the scanning of said video map a plurality of pulse pairs at said second frequency, the initial pulse of each pulse pair being transmitted substantially simultaneously with an altitude-distinctive or sync pulse and the interval between the pulses of each pulse pair being determined by the output produced by the scanning of the video map at that instant, means at the aircraft including said last-mentioned receiving means for receiving certain of these pulse pairs as said second rotating directional beam sweeps thereby, means at the aircraft for comparing the time interval between the reception of the pulses of each said pulse pair and the time interval between the pulses of the range pair of pulses received from said first rotating directional beam, means at the aircraft for transmitting alternatively a first or second characteristic pulse to denote which time interval is greater, means at the ground station for receiving the transmitted characteristic pulse, and means at the ground station for determining its characteristic to indicate the particular parallel lane in which the aircraft is located at its altitude.

18. Apparatus according to claim 15 including means at the ground station including said first-mentioned second frequency transmitting means for transmitting omni-directionally at said second frequency a fourth and a fifth pulse spaced after the first of said three additional pulses and each substantially simultaneously with one of said altitude-distinctive or sync pulses, the spacing between said fourth pulse and said first pulse being proportional to the length from the ground station of the secondary leg of the airlane and the spacing between said fifth pulse and said first pulse being proportional to the length of the corresponding primary leg, means at the aircraft including said last-mentioned receiving means for receiving said fourth and fifth omni-directional pulses, and means at the aircraft for converting the time interval between the reception of these pulses and said first pulse into indications of the length of the secondary leg and the length of the primary leg of the airlane respectively.

19. Apparatus according to claim 15 including means at the aircraft for transmitting alternatively a first or second characteristic pulse to denote whether the third of said three additional pulses transmitted omni-directionally or the directionally-transmitted pulses are received first at the aircraft, means at the ground station for receiving the transmitted characteristic pulse, and means connected to said receiving means for determining its characteristic to indicate whether the aircraft is located to the right or left of the center line of the airlane.

20. Apparatus for indicating at an aircraft its horizontal range from a fixed point when the altitude of the aircraft relative to the fixed point is known at the latter, comprising means at said fixed point for determining the slant range to the aircraft, means for computing therefrom and from the known altitude of the aircraft the horizontal range to the aircraft, means for transmitting a pair of pulses whose separation is proportional to this horizontal range, means at the aircraft for receiving said pair of pulses, and means at the aircraft for converting the time interval between said pair of pulses into a range indication.

OSCAR S. FIELD.
JOHN E. FREEHAFER.

REFERENCES CITED

The following references are of record in the file of this patent:

UNITED STATES PATENTS

| Number | Name | Date |
|---|---|---|
| Re. 22,672 | Shumard | Aug. 28, 1945 |
| 1,894,019 | Buckley | Jan. 10, 1933 |
| 2,003,329 | Young | June 4, 1935 |
| 2,053,661 | Hansell | Sept. 8, 1936 |
| 2,105,470 | Bower | Jan. 18, 1938 |
| 2,171,293 | Plastino | Aug. 29, 1939 |
| 2,301,193 | Bradford | Nov. 10, 1942 |
| 2,301,196 | Bradford | Nov. 10, 1942 |
| 2,334,537 | Brown | Nov. 16, 1943 |
| 2,370,176 | Kornei | Feb. 27, 1945 |
| 2,384,379 | Ingram | Sept. 4, 1945 |
| 2,402,432 | Mumma | June 18, 1946 |
| 2,412,092 | Mayle | Dec. 3, 1946 |
| 2,421,017 | Deloraine | May 27, 1947 |
| 2,430,038 | Wertz | Nov. 4, 1947 |
| 2,437,173 | Rutherford | Mar. 2, 1948 |
| 2,448,016 | Busignies | Aug. 31, 1948 |
| 2,444,651 | Jones | July 6, 1948 |
| 2,468,045 | Deloraine | Apr. 26, 1949 |
| 2,471,416 | Deloraine | May 31, 1949 |
| 2,473,175 | Ridenour | June 14, 1949 |
| 2,490,268 | Herbst | Dec. 6, 1949 |
| 2,513,282 | Busignies | July 4, 1950 |